(12) United States Patent
Dinker et al.

(10) Patent No.: US 8,229,945 B2
(45) Date of Patent: Jul. 24, 2012

(54) SCALABLE DATABASE MANAGEMENT SOFTWARE ON A CLUSTER OF NODES USING A SHARED-DISTRIBUTED FLASH MEMORY

(75) Inventors: Darpan Dinker, Union City, CA (US); Andrew David Eckhardt, Menlo Park, CA (US); Darryl Manabu Ouye, Aptos, CA (US); Brian Walter O'Krafka, Austin, TX (US); Earl T. Cohen, Oakland, CA (US); Thomas M. McWilliams, Oakland, CA (US)

(73) Assignee: Schooner Information Technology, Inc., Sunnyvale, CA (US)

( * ) Notice: Subject to any disclaimer, the term of this patent is extended or adjusted under 35 U.S.C. 154(b) by 585 days.

(21) Appl. No.: 12/276,540

(22) Filed: Nov. 24, 2008

(65) Prior Publication Data

US 2009/0240664 A1 Sep. 24, 2009

Related U.S. Application Data

(63) Continuation-in-part of application No. 12/130,661, filed on May 30, 2008, and a continuation-in-part of application No. 12/197,899, filed on Aug. 25, 2008.

(60) Provisional application No. 61/038,336, filed on Mar. 20, 2008.

(51) Int. Cl.
*G06F 7/00* (2006.01)
*G06F 17/30* (2006.01)

(52) U.S. Cl. ......... 707/764; 707/758; 707/781; 707/802

(58) Field of Classification Search ....................... None
See application file for complete search history.

(56) References Cited

U.S. PATENT DOCUMENTS

| | | | |
|---|---|---|---|
| 5,046,002 A | 9/1991 | Takashi et al. | |
| 5,212,789 A | 5/1993 | Rago | |
| 5,287,496 A | 2/1994 | Chen et al. | |
| 5,423,037 A | 6/1995 | Hvasshovd | |
| 5,701,480 A | 12/1997 | Raz | |
| 6,216,126 B1 | 4/2001 | Ronstrom | |
| 6,298,390 B1 | 10/2001 | Matena et al. | |
| 6,434,144 B1 | 8/2002 | Romanov | |
| 7,010,521 B2 | 3/2006 | Hinshaw et al. | |
| 7,162,467 B2 | 1/2007 | Eshleman et al. | |
| 7,272,605 B1 | 9/2007 | Hinshaw et al. | |
| 7,305,386 B2 | 12/2007 | Hinshaw et al. | |
| 7,542,968 B2 * | 6/2009 | Yokomizo et al. | 1/1 |
| 7,562,162 B2 * | 7/2009 | Kreiner et al. | 710/11 |
| 7,584,222 B1 * | 9/2009 | Georgiev | 1/1 |

(Continued)

*Primary Examiner* — Paul Kim
(74) *Attorney, Agent, or Firm* — Brokaw Patent Law PC; Christopher J Brokaw

(57) ABSTRACT

A distributed database system has multiple compute nodes each running an instance of a database management system (DBMS) program that accesses database records in a local buffer cache. Records are persistently stored in distributed flash memory on multiple storage nodes. A Sharing Data Fabric (SDF) is a middleware layer between the DBMS programs and the storage nodes and has API functions called by the DBMS programs when a requested record is not present in the local buffer cache. The SDF fetches the requested record from flash memory and loads a copy into the local buffer cache. The SDF has threads on a home storage node that locate database records using a node map. A global cache directory locks and pins records to local buffer caches for updating by a node's DBMS program. DBMS operations are grouped into transactions that are committed or aborted together as a unit.

14 Claims, 21 Drawing Sheets

U.S. PATENT DOCUMENTS

| | | |
|---|---|---|
| 2002/0166031 A1* | 11/2002 | Chen et al. .................. 711/141 |
| 2002/0184239 A1* | 12/2002 | Mosher et al. ............... 707/200 |
| 2004/0078379 A1 | 4/2004 | Hinshaw et al. |
| 2004/0267835 A1* | 12/2004 | Zwilling et al. ............. 707/202 |
| 2005/0027701 A1 | 2/2005 | Zane et al. |
| 2005/0028134 A1 | 2/2005 | Zane et al. |
| 2006/0212795 A1 | 9/2006 | Cottrille et al. |
| 2007/0276784 A1 | 11/2007 | Piedmonte |
| 2007/0299816 A1 | 12/2007 | Arora et al. |

* cited by examiner

GET MISS FROM HOME FLASH INSIDE A TRANSACTION

ABORT TRANSACTION

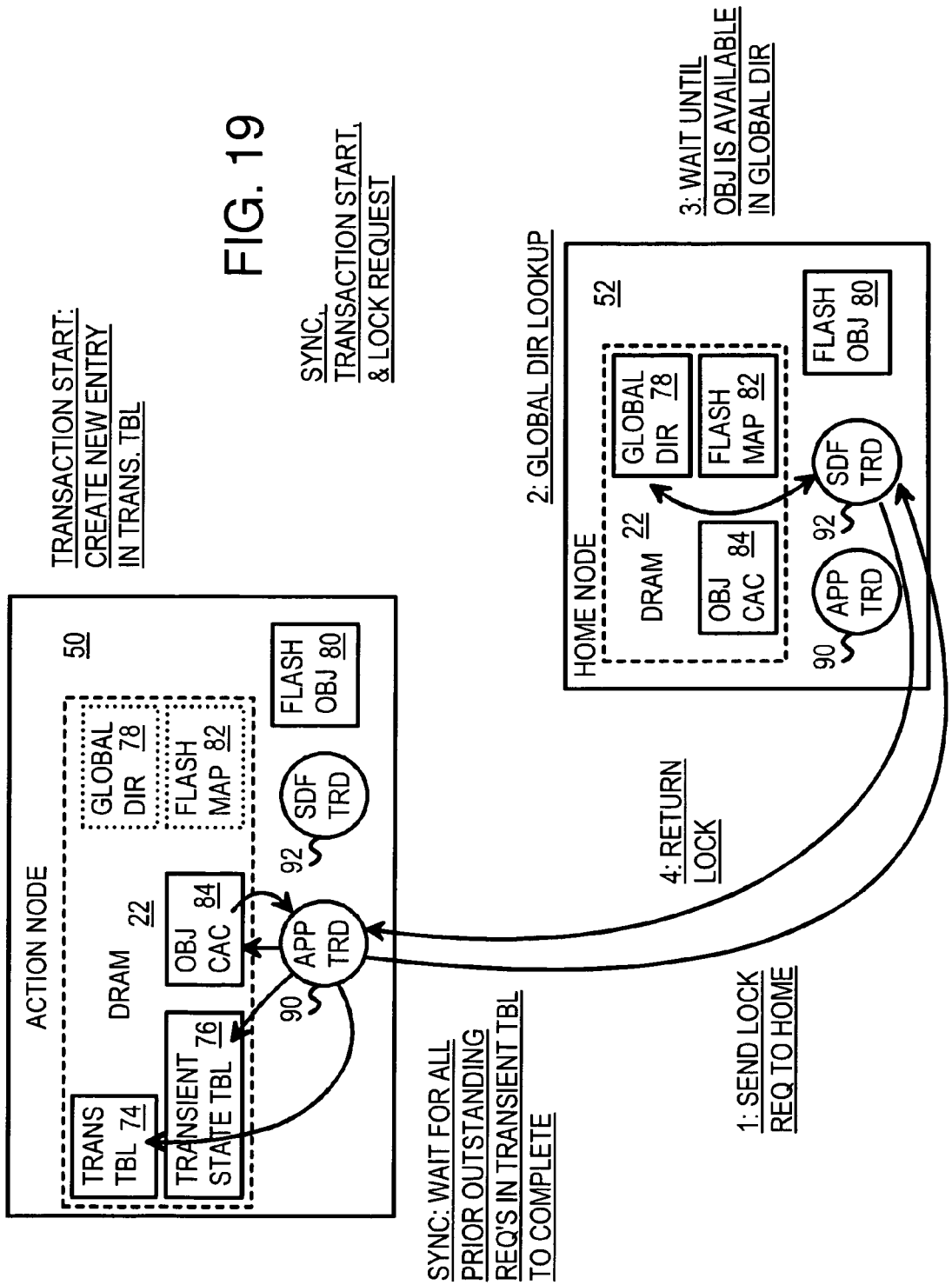

SCALABLE DATABASE MANAGEMENT SOFTWARE ON A CLUSTER OF NODES USING A SHARED-DISTRIBUTED FLASH MEMORY

RELATED APPLICATIONS

This application claims the benefit of U.S. Provisional Application No. 61/038,336 filed Mar. 20, 2008. This application is a Continuation-In-Part (CIP) of the co-pending U.S. application for "System Including a Fine-Grained Memory and a Less-Fine-Grained Memory", U.S. Ser. No. 12/130,661, filed May 30, 2008, and the co-pending PCT application for "System Including a Less-Fine-Grained Memory and a Fine-Grained Memory with a Write Buffer for the Less-Fine-Grained Memory", U.S. Ser. No. PCT/US08/65167, filed May 29, 2008, and the co-pending U.S. application for "Sharing Data Fabric for Coherent-Distributed Caching of Multi-Node Shared-Distributed Flash Memory", U.S. Ser. No. 12/197,899, filed Aug. 25, 2008, hereby incorporated by reference.

FIELD OF THE INVENTION

This invention relates to database systems, and more particularly to distributed database programs running on multiple nodes with distributed flash memory.

BACKGROUND OF THE INVENTION

Database programs are one of the most widely used and useful applications of computers. Data records may be stored in database tables that are linked to one another in a relational database. Queries from users allow database programs to locate matching records and display them to users for modification. Often a large number of users access different records in a database simultaneously.

Database records are typically stored on rotating hard disks. Computer hard-disk technology and the resulting storage densities have grown rapidly. Despite a substantial increase in storage requirements, disk-drive storage densities have been able to keep up. Disk performance, however, has not been able to keep up. Access time and rotational speed of disks, key performance parameters in database applications, have only improved incrementally in the last 10 years.

Web sites on the Internet may link to vast amounts of data in a database, and large web server farms may host many web sites. Storage Area Networks (SANs) are widely used as a centralized data store. Another widespread storage technology is Network Attached Storage (NAS). These disk-based technologies are now widely deployed but consume substantial amounts of power and can become a central-resource bottleneck. The recent rise in energy costs makes further expansion of these disk-based server farms undesirable. Newer, lower-power technologies are desirable.

FIG. 1 highlights a prior-art bottleneck problem with a distributed web-based database server. A large number of users access data in database 16 through servers 12 via web 10. Web 10 can be the Internet, a local Intranet, or other network. As the number of users accessing database 16 increases, additional servers 12 may be added to handle the increased workload. However, database 16 is accessible only through database server 14. The many requests to read or write data in database 16 must funnel through database server 14, creating a bottleneck that can limit performance.

FIG. 2 highlights a coherency problem when a database is replicated to reduce bottlenecks. Replicating database 16 by creating a second database 16' that is accessible through second database server 14' can reduce the bottleneck problem by servicing read queries. However, a new coherency problem is created with any updates to the database. One user may write a data record on database 16, while a second user reads a copy of that same record on second database 16'. Does the second user read the old record or the new record? How does the copy of the record on second database 16' get updated? Complex distributed database software or a sophisticated scalable clustered hardware platform is needed to ensure coherency of replicated data accessible by multiple servers.

Adding second database 16' increases the power consumption, since a second set of disks must be rotated and cooled. Operating the motors to physically spin the hard disks and run fans and air conditioners to cool them requires a substantially large amount of power.

It has been estimated (by J. Koomey of Stanford University) that aggregate electricity use for servers doubled from 2000 to 2005 both in the U.S. and worldwide. Total power for servers and the required auxiliary infrastructure represented about 1.2% of total US electricity consumption in 2005. As the Internet and its data storage requirements seem to increase exponentially, these power costs will ominously increase.

Flash memory has replaced floppy disks for personal data transport. Many small key-chain flash devices are available that can each store a few GB of data. Flash storage may also be used for data backup and some other specialized applications. Flash memory uses much less power than rotating hard disks, but the different interfacing requirements of flash have limited its use in large server farms. Flash memory's random-access bandwidth and latency are orders of magnitude better than rotating disks, but the slow write time of flash memory relative to its read time complicates the coherency problem of distributed databases.

Balancing workloads among the servers is also problematic. Database server 14 may become busy processing a particularly slow or difficult user query. Incoming user queries could be assigned in a round-robin fashion among database servers 14, 14', but then half of the incoming queries would back up behind the slow query in database server 14.

What is desired is a large database management system that stores database records in flash memory rather than in hard disks to reduce power consumption. A flash memory system with many nodes that acts as a global shared address space on which multiple instances of the database management system execute is desirable. A distributed database stored on a global, shared flash memory spread across many nodes that can be accessed by many instances of a database management system is desirable due to its scalability.

BRIEF DESCRIPTION OF THE DRAWINGS

FIG. 19 shows sync, transaction start, and lock operations.

DETAILED DESCRIPTION

The present invention relates to an improvement in distributed database management systems. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 3:
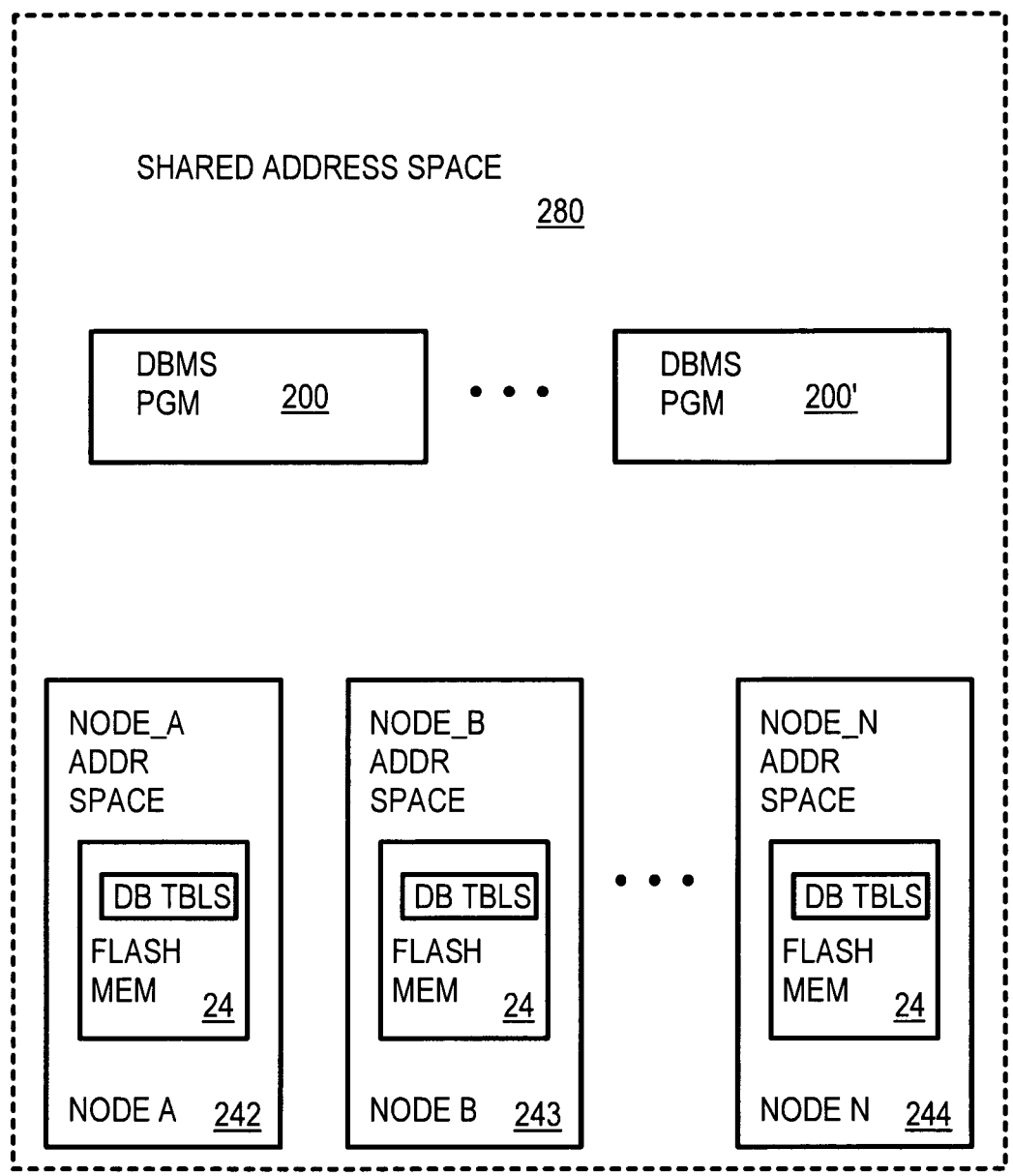
FIG. 3 shows a database management system that has multiple instances running in a shared memory space accessing a database that is distributed across flash memory in many nodes.

FIG. 3 shows a database management system that has multiple instances running in a shard memory space accessing a database that is distributed across flash memory in many nodes. Rather than storing the database on a single compute node, the database is partitioned so that different tables are stored on different nodes 242, 243, 244. Reliability is improved since database tables may be replicated and kept updated on several nodes, allowing for backup nodes to replace nodes that fail.

Database tables are stored in flash memory 24 in each node 242, 243, 244, with each node typically storing a different set of database tables. Shared address space 280 (also called a node address space) is used to access flash memory of one or more of the nodes. The nodes provide one or more partitions (also called shards) of the shared address space.

Multiple instances of DataBase Management System (DBMS) program 200, 200' are executing within shared address space 280 and are able to access data items in the distributed database that are physically stored in flash memory 24 on nodes 242, 243, 244. Having multiple instances of database management system (DBMS) program 200, 200' also improves reliability and reduces bottleneck problems, since user queries may be dispatched to different executing instances of DBMS program 200, 200'.

Having DBMS program 200 execute in shared address space 280 allows the program to see just one address space, simplifying DBMS program 200. Ideally, it would be desirable for multiple executing instances of DBMS program 200, 200' running on different physical nodes to observe shared address space 280 so that each could operate as if it is the only executing instance of DBMS program 200. Thus major modifications and re-writes of the program code of DBMS program 200 could be avoided using shared address space 280. A DBMS program written for execution on a single address space is preferred since code does not have to be re-written. However, without other facilities, the multiple executing instances of DBMS program 200, 200' would contend with each other for the same resources, causing failures.

Figure 4:
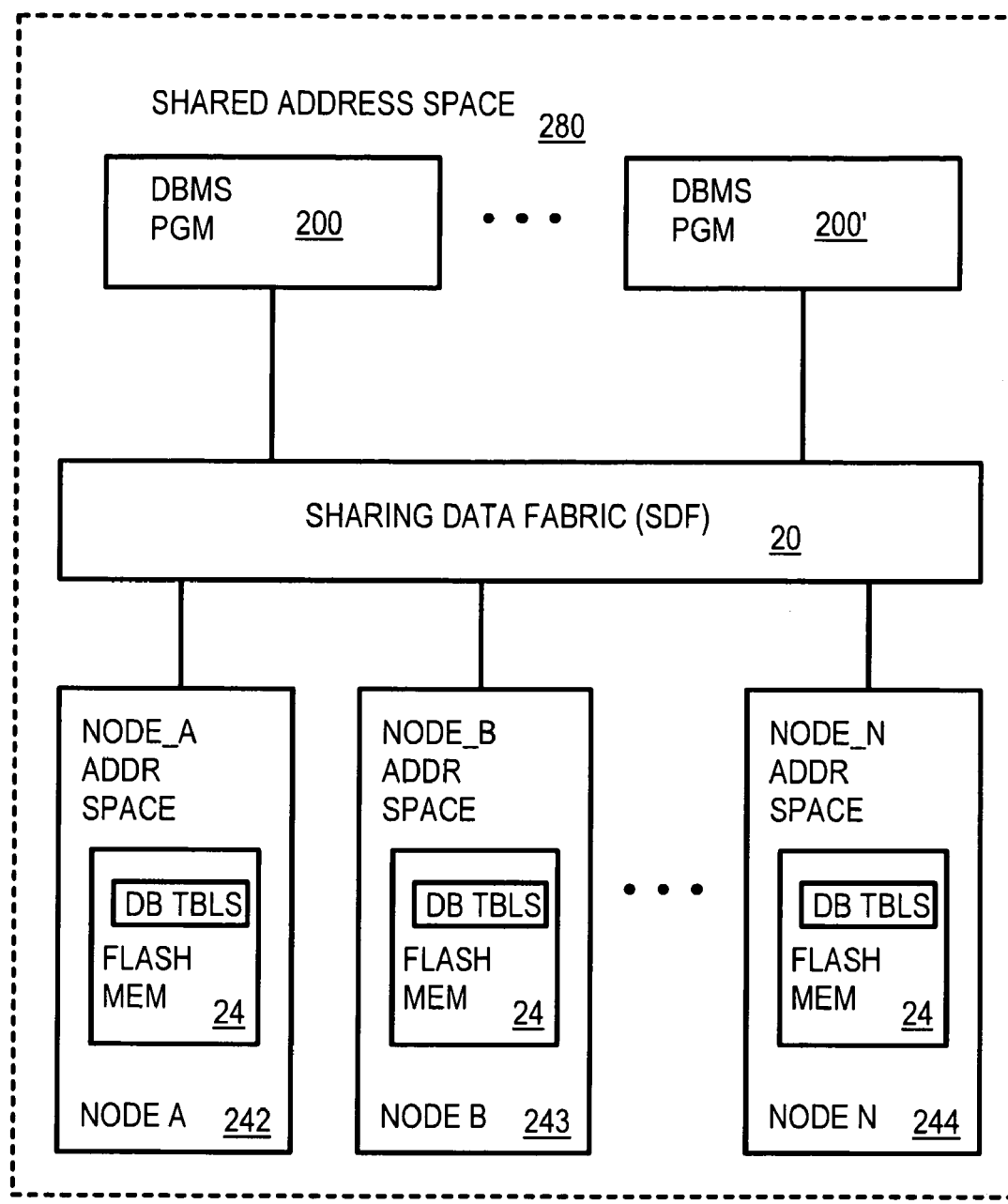
FIG. 4 shows a Sharing Data Fabric (SDF) that enables multiple instances of a DBMS program to access a partitioned database stored in flash memory on multiple nodes.

FIG. 4 shows a Sharing Data Fabric (SDF) that enables multiple instances of a DBMS program to access a partitioned database stored in flash memory on multiple nodes. The SDF is a middleware layer that fits between executing instances of DBMS program 200, 200' and nodes 242, 243, 244.

SDF 20 includes an interface for communications between high-level programs such as executing instances of DBMS program 200, 200' and lower-level hardware controllers and their software and firmware drivers. SDF 20 is accessible by high-level instances of DBMS program 200, 200' using an applications-programming interface (API). Communication between nodes to ensure coherency of database tables stored in flash memory 24 on the multiple nodes is performed by SDF 20.

Figure 1:
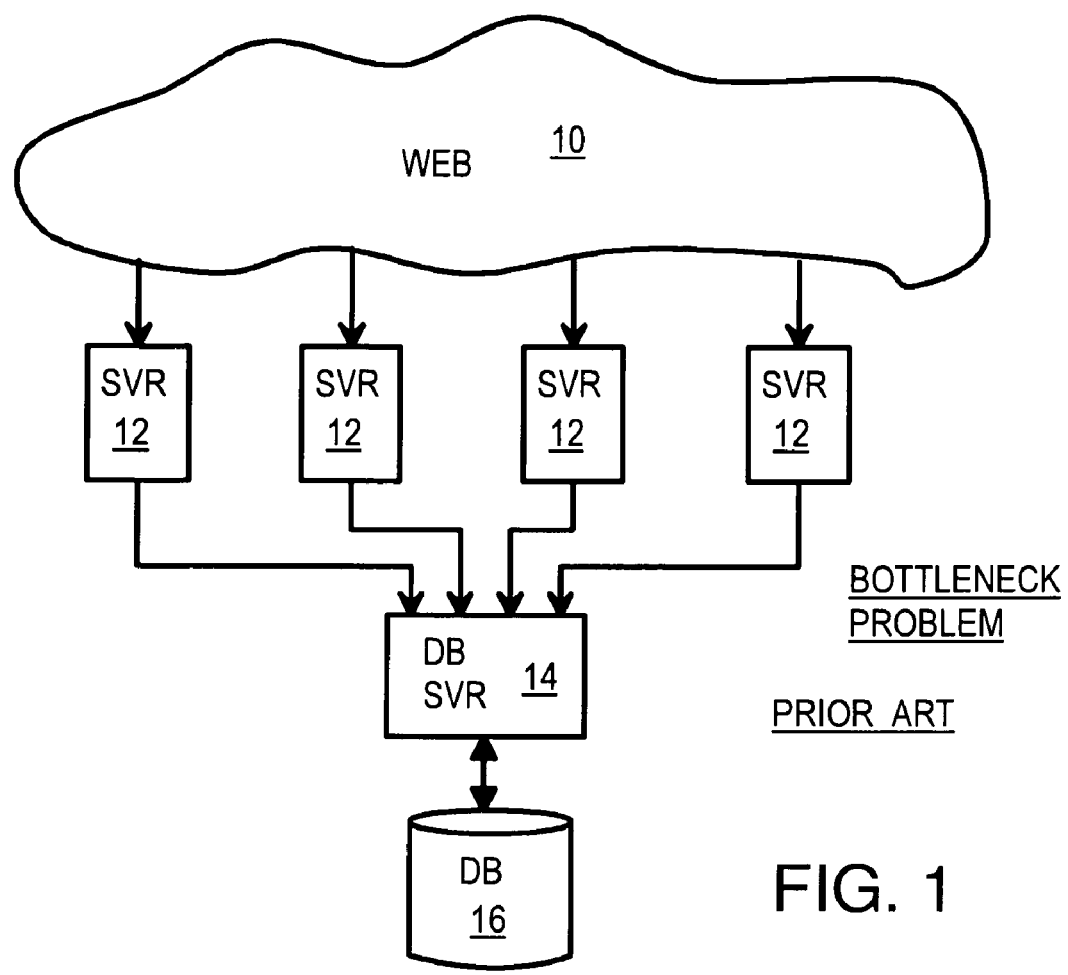
FIG. 1 highlights a prior-art bottleneck problem with a distributed web-based database server.
Figure 2:
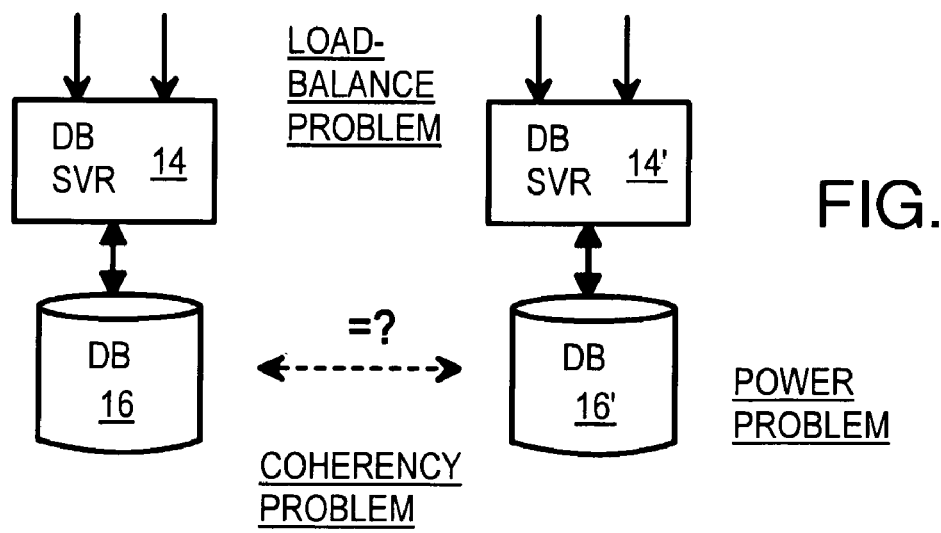
FIG. 2 highlights a coherency problem when a database is replicated to reduce bottlenecks.

Normally, adding nodes provides a less-than-linear performance improvement, since bottlenecks may occur to data stored in just one location on a node, such as shown on FIG. 1. However, using SDF 20, data records stored in flash memory 24 may be cached near executing instances of DBMS program 200, 200' on one or more nodes, allowing multiple processors to access the same data. Coherency of the cached database records is important to prevent data corruption.

Figure 5:
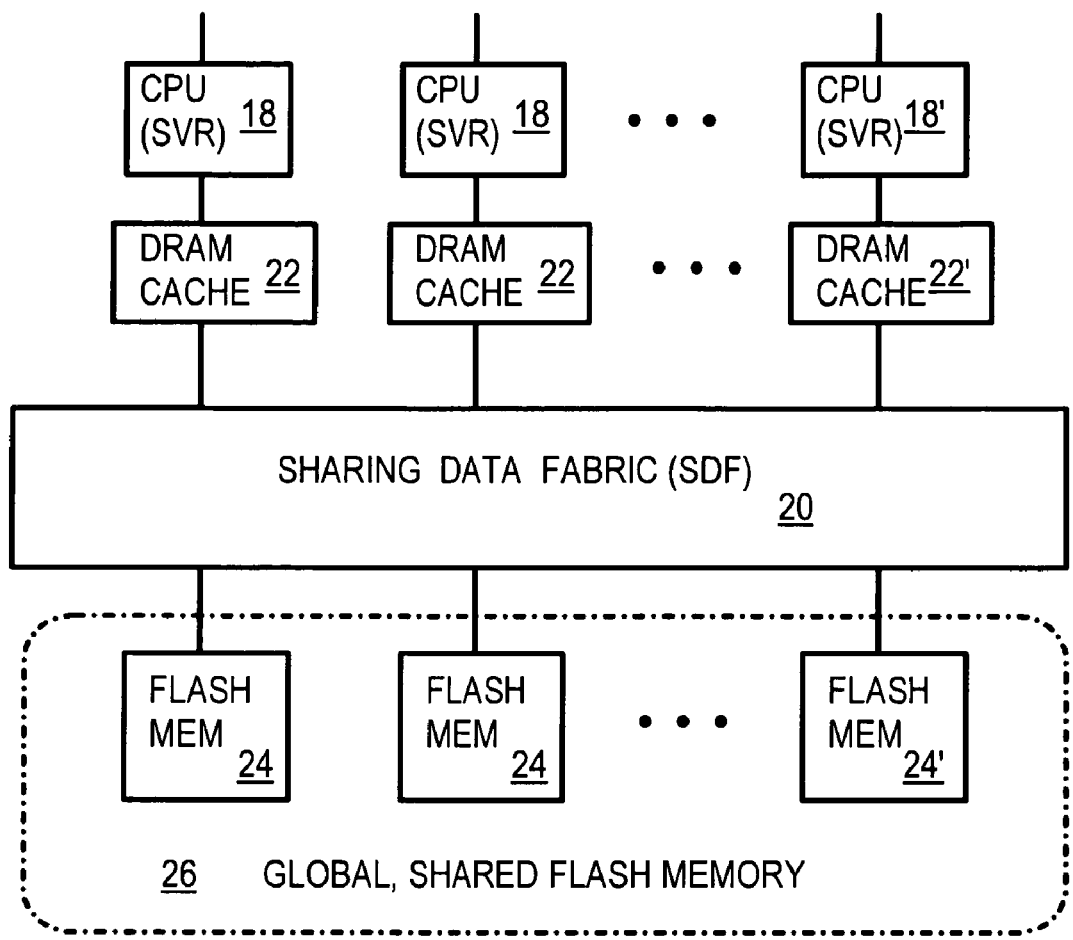
FIG. 5 shows a global, shared flash memory that appears to be a single global address space to multiple servers connected to a sharing data fabric.

FIG. 5 shows a global, shared flash memory that is accessible as a single global address space to multiple servers connected to a sharing data fabric (SDF). Central Processing Units (CPUs) or processors 18, 18' can execute programs such as executing instances of a DBMS program to process requests such as user queries of a database that arrive over a network such as the Internet. Each of processors 18 has a cache of DRAM 22 that contain local copies of objects such as records in a database. These local copies in DRAM 22 are local to the node containing processors 18 and are accessed by processors 18 in response to requests from external users.

While DRAM 22, 22' stores transient copies of objects, the objects are more permanently stored in flash memory 24, 24'. Objects remain in flash memory 24, 24' and are copied to caches in DRAM 22, 22' in response to access requests by programs running on processors 18, 18'.

Sharing data fabric (SDF) 20 is a middleware layer that includes SDF threads running on processors 18, 18', and APIs and tables of data. A physical interconnect, such as an Ethernet or InfiniBand® fabric, connects physical nodes together. Object copies are transferred across the physical interconnect by SDF 20 from flash memory 24, 24' to caches in DRAM 22, 22', and among DRAM 22, 22' caches as needed to ensure coherency of object copies.

Flash memory 24, 24' can be physically located on many nodes, such as having one flash memory 24 for each processor 18, or in other arrangements. SDF 20 makes all the objects stored in flash memory 24, 24' appear to be stored in a global address space, even though the global address spaced is shared among many processors 18, 18'. Thus flash memory 24, 24' together appear to be one global, shared flash memory 26 via SDF 20. The database is partitioned into many objects, which are stored in a distributed fashion on many nodes within the global shared flash memory.

Figure 6:
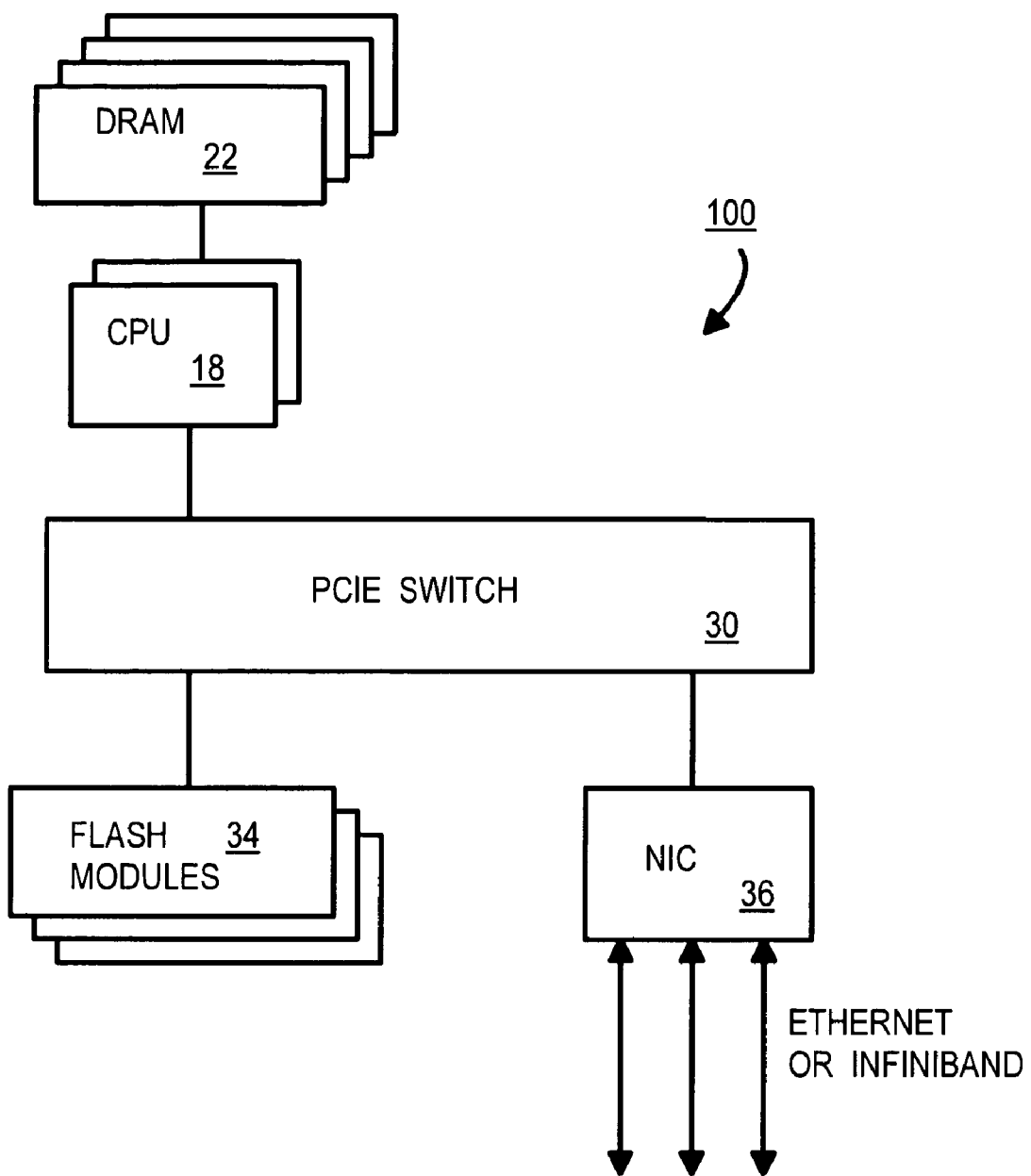
FIG. 6 shows a hardware node in a global, shared flash memory system.

FIG. 6 shows a hardware node in a global, shared flash memory system. A flash memory system has multiple nodes such as shown in FIG. 6. The multiple nodes are connected together by a high-speed interconnect such as an Ethernet or InfiniBand. One or more links in this high-speed interconnect connect to Network Interface Controller (NIC) 36 on the node shown in FIG. 6.

Processor 18 executes an instance of a DBMS program, threads, and other routines and accesses a local memory that stores program code and data, such as DRAM 22. DRAM 22 also acts as a cache of objects such as database records in the global, shared flash memory.

Processor 18 also connects to PCIe switch 30. PCIe switch 30 allows processor 18 to communicate with other nodes through NIC 36 to send and receive object copies and coherency commands. Flash modules 34 contain arrays of flash memory that store permanent objects including database records and tables. Flash modules 34 are accessed by processor 18 through PCIe switch 30.

Figure 7:
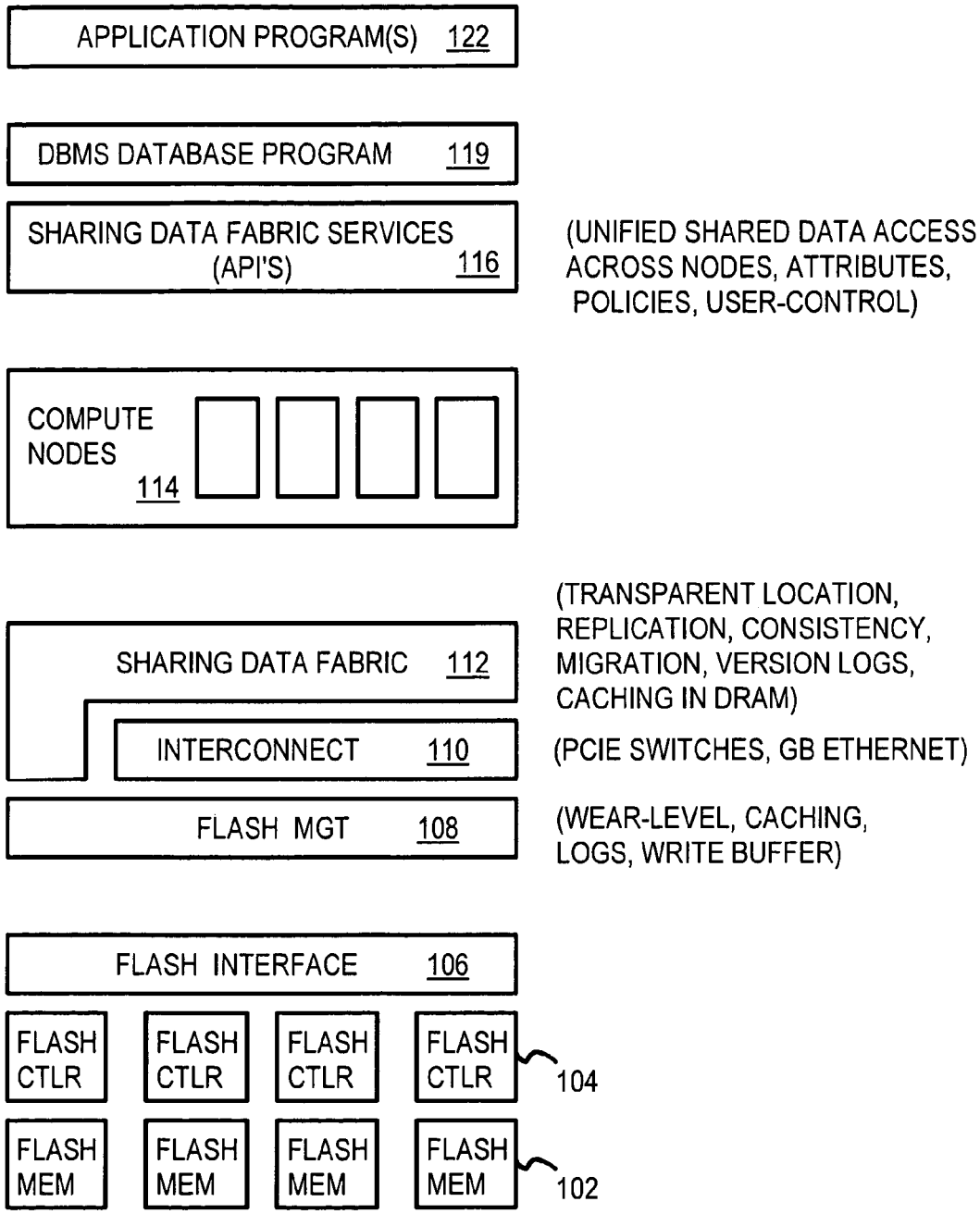
FIG. 7 is a layer diagram of software and hardware layers in a flash memory system using a shared data fabric to enable global sharing of database records in a distributed flash memory.

FIG. 7 is a layer diagram of software and hardware layers in a flash memory system using a shared data fabric to enable global sharing of database records in a distributed flash memory. Sharing data fabric services 116 include API's that application programs 122 or DBMS database program 119 can use to access objects such as database records and control attributes of the objects. Sharing data fabric services 116 are the API's that communicate with routines and threads in sharing data fabric 112 that provide a unified shared data access of objects including database tables that are permanently stored in flash memory 102, and may maintain cached copies in DRAM in compute nodes 114.

Compute nodes 114 are compute nodes, such as node 100 shown in FIG. 6, with processors, DRAM caches of objects, and interconnect. These compute nodes may be constructed from commodity parts, such as commodity processors, interconnect switches and controllers, and DRAM memory modules.

Sharing data fabric services 116 allow application programs 122 and DBMS database program 119 to control policies and attributes of objects by executing routines and launching threads of sharing data fabric 112 that are executed on compute nodes 114. The exact location of objects and database records within flash memory 102 is transparent to application programs 122 and DBMS database program 119 since sharing data fabric 112 copies objects from flash memory 102 to DRAM caches in compute nodes 114 and may obtain a copy from any location in flash memory 102 that has a valid copy of the object. Objects such as database tables may be replicated to make back-up copies in flash memory 102.

Sharing data fabric 112 performs consistency and coherency operations such as flushing modified objects in a DRAM cache to copy back and update the permanent object in flash memory 102. Sharing data fabric 112 may also migrate flash objects to new flash pages for wear-leveling or other purposes, and update version logs and transaction logs.

Interconnect 110 includes the PCIe switches in each of compute nodes 114, and the high-speed interconnect between nodes, such as Ethernet or InfiniBand links. Sharing data fabric 112 sends objects and coherency commands across interconnect 110 or directly within the compute node, such as directly to flash management 108.

Flash management 108 is activated to migrate flash blocks for wear-leveling and replication. Wear-leveling schemes assign flash blocks for writing in a rotating, least-written, or other fashion to even out usage of flash blocks and prevent early wear-out and failure. Write buffers of flash blocks, logs, and caches may be kept by flash management 108.

Flash interface 106 is an interface between flash management 108 and hardware flash controllers 104, which control low-level access of flash memory 102. While flash memory 102 may have separate modules on different nodes of compute nodes 114, sharing data fabric 112 uses interconnect 110, flash management 108, and flash interface 106 to transparently move objects to and from flash memory 102 on different nodes. Flash memory 102 in aggregate appears to be a single, unified flash memory that is transparently shared among many instances of DBMS database program 119 running on many compute nodes 114.

Figure 8:
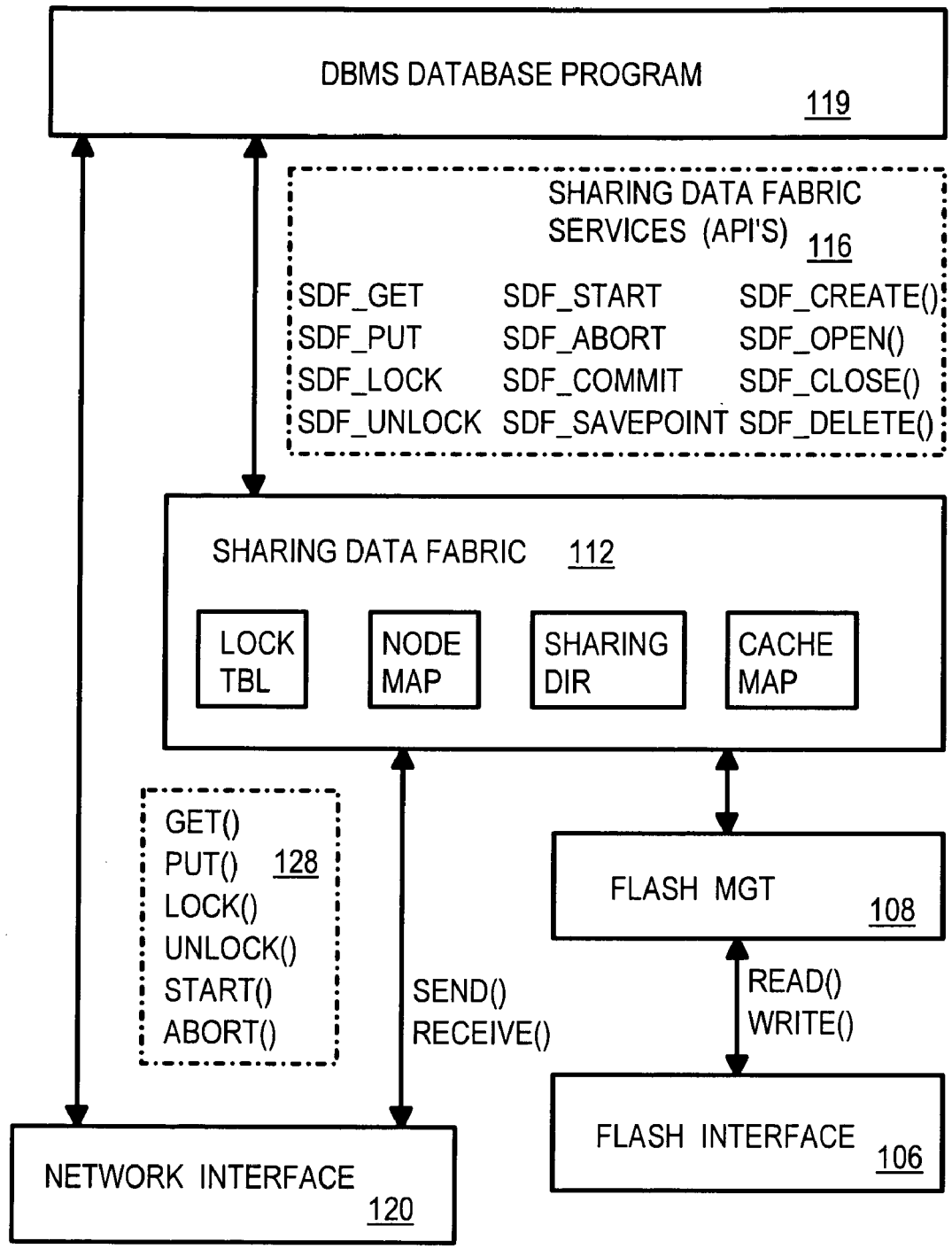
FIG. 8 is a transaction diagram of services and interfaces to a shared data fabric.

FIG. 8 is a diagram of services and interfaces to a shared data fabric. DBMS database program 119 could communicate directly with other database nodes using network interface 120, but then the location of objects such as database records in flash memory is not transparent to DBMS database program 119. DBMS database program 119 would then need detailed location information on database records. Send and receive commands to network interface 120 may include commands 128 such as get, put, lock, unlock, start, and abort, which need detailed information on the object's location, such as a file handle or address Detailed information may include context, thread, container ID, object ID. Location information may be calculated by using a combination of the container ID and the object ID. DBMS database program 119 would have to be re-written to provide this detailed location information, which is undesirable.

Instead, standard, substantially unmodified DBMS database program 119 is used, but instead of using network interface 120 directly, DBMS database program 119 accesses sharing data fabric 112 using API's 116. API's 116 include SDF_GET, SDF_PUT, SDF_LOCK, and other SDF-specific versions of start, abort, commit, savepoint, create, delete, open, and close commands. For example, lock and unlock commands lock and unlock an object using a lock table in sharing data fabric 112 to prevent another user from accessing that object while locked. A node map in sharing data fabric 112 maps objects to address locations in flash memory, allowing sharing data fabric 112 to read and write objects in flash memory through flash management 108 and flash interface 106.

Objects that reside in flash memory on a first node may be accessed over sharing data fabric 112 by sending and receiving messages, and sending object data from a second node over network interface 120. These messages may include commands 128 such as get, put, lock, unlock, start, and abort. These commands 128 are executed by SDF 112 using detailed information on the object's location, such as a file handle or address, that are obtained from a node map, a sharing directory, or a cache map in sharing data fabric 112. Commands 128 and messages are received by a sharing data fabric 112 on the first node, which may access its flash memory to obtain the object. On a read access, sharing data fabric 112 on the first node can then send the object data back through network interface 120 to the second node's sharing data fabric 112.

Figure 9:
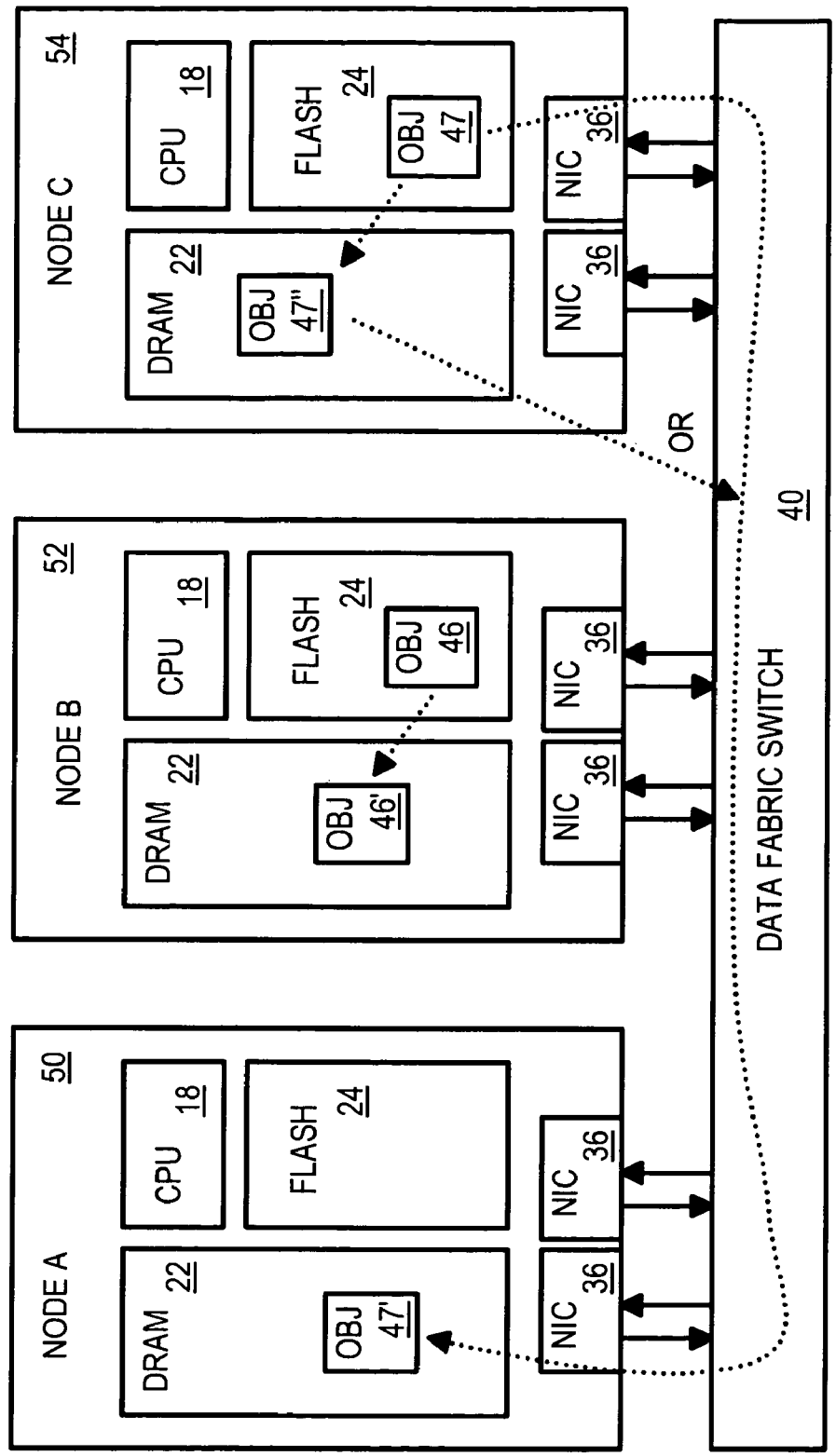
FIG. 9 shows permanent objects in flash memory being copied to DRAM caches on multiple nodes.

FIG. 9 shows permanent objects in flash memory being copied to DRAM caches on multiple nodes. Objects may be database records being accessed by a user query. Data fabric switch 40 connects to NIC 36 on three compute nodes. Each node has two NICs 36 to allow for a higher interconnect bandwidth and for redundancy. Each of nodes 50, 52, 54 has a processor 18, flash memory 24, and an object cache in DRAM 22. An Ethernet or other switch (not shown) may also be used, or may be included in data fabric switch 40.

In response to a user database query, a thread executing on processor 18 on node 52 requests access to object 46, which is present in flash memory 24 on node 52. The SDF on node 52 reads object 46 from flash memory 24 and copies the object into its object cache in DRAM 22 as object copy 46'. The DBMS program running on node 52 can then read object copy 46' from its DRAM 22. In this example transfer over data fabric switch 40 was not needed.

In a second example, a thread executing on processor 18 on node 50 requests access to object 47, which is not present in flash memory 24 on node 50, nor in DRAM 22 on node 50. The SDF on node 50 determines that node 54 is the home node for object 47. Node 50 may perform a lookup in a directory to locate the object's home node. The directory may have several parts or levels and may reside partially on local node 50 and partially on other nodes.

An SDF thread on node 50 sends a message to the home node, node 54, requesting a copy of object 47. In response, another SDF thread on home node 54 reads object 47 from flash memory 24 and sends object 47 over data fabric switch 40 to local node 50. The SDF thread on local node 50 copies the object data into its object cache in DRAM 22 as object copy 47'. The DBMS program running on local node 50 can then read object copy 47' from its object cache in DRAM 22.

Object 47 may have already been copied into DRAM 22 on node 54 as object copy 47". Rather than read object 47 from flash memory 24, when object copy 47" is present, object copy 47" may be read from DRAM 22 and then sent over data fabric switch 40 to node 50 to load object copy 47' into DRAM 22 on node 50.

Figure 10:
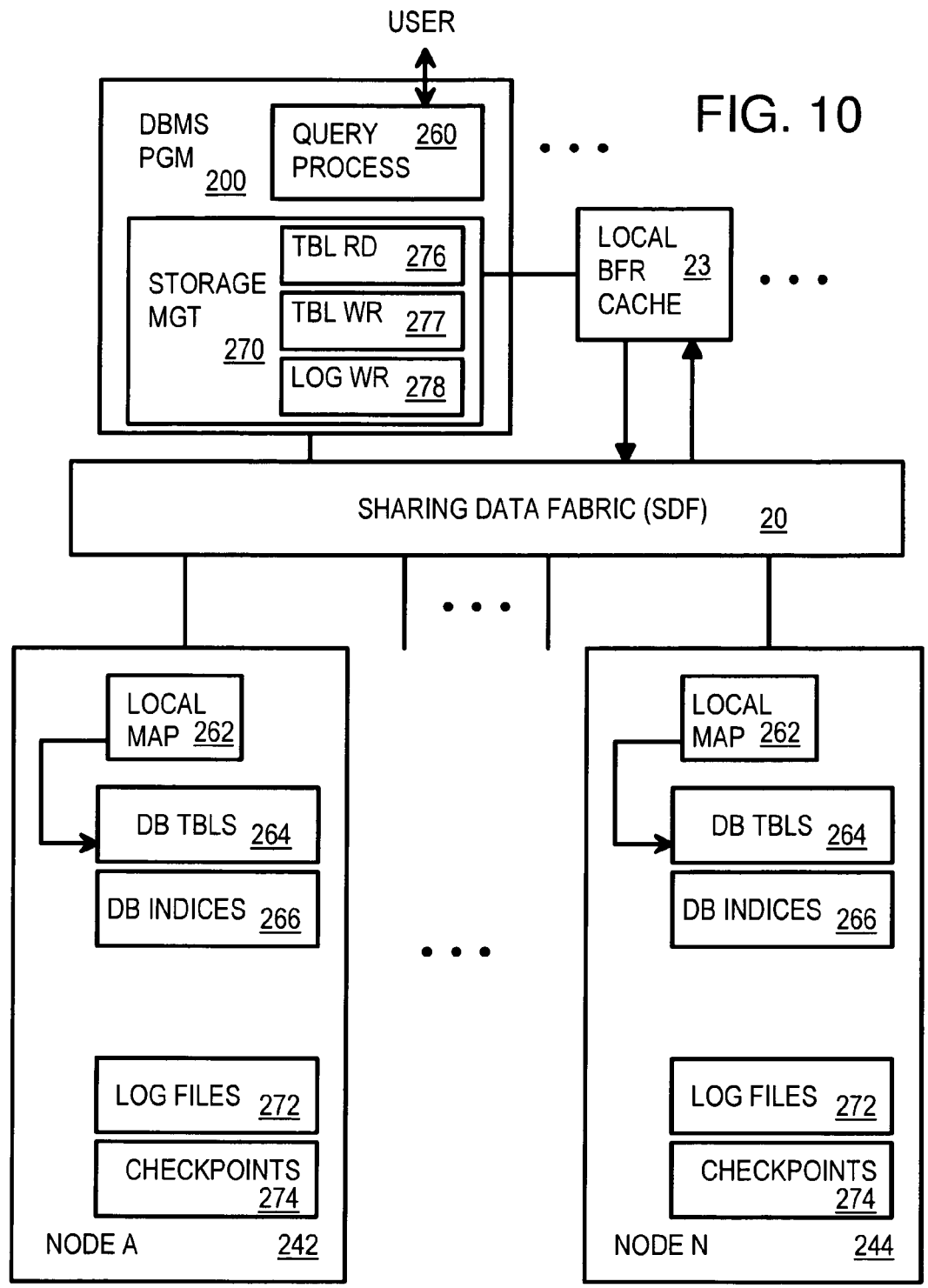
FIG. 10 shows components of a DBMS that access a database stored in a distributed shared global flash memory.

FIG. 10 shows components of a DBMS in more detail that access a database stored in a distributed shared global flash memory. DBMS program 200 is executing on a local compute node that has database records cached in local DRAM as cached objects in local buffer cache 23. There may be multiple executing instances of DBMS program 200 running on different compute nodes, each with its own local cache buffer.

DBMS program 200 has two primary software components that cooperate with each other. Query process 260 receives requests from users that contain a database query. Storage management 270 performs access of database records that are cached in local buffer cache 23. Storage management 270 includes table reader 276 that reads records from portions of a database table cached in local buffer cache 23, table writer 277 that writes or modifies portions of a database table cached in local buffer cache 23, and log writer 278 that logs modifications of records cached in local buffer cache 23. While query process 260 performs query logical operations, query process 260 does not access database records, but instead calls storage management 270 to read or write a record. Separating query and access functions an improve software reliability.

SDF 20 is called by storage management 270 when a requested database record is not cached in local buffer cache 23, or during flushes when modified records are copied back to the more persistent storage in flash memory. SDF 20 performs the multi-node operations needed to access data at one of nodes 242, 244 and copy that data into local buffer cache 23 or update that data in flash memory at the node.

The database record may be stored in flash memory at any of nodes 242, 244. Each node 242, 244 has local map 262 that locates the requested data item stored in flash memory at that node. The requested data may be a database record stored in database tables 264, or a database index in database indices 266. Other data stored at a node may include log files 272 or checkpoints 274 that are useful for error recovery.

An example of a Database Management System (DBMS) is a system of one or more software programs, which are written to enable the storage and management of user information in a highly structured and well-defined way. The DBMS enables certain storage properties such as Atomicity, Consistency, Isolation, and Durability, the so-called ACID properties.

Information may be stored as data records organized in n-tuples (also termed simply tuples) of closely related information called rows. A field of a row stores one of the records. Collections of rows are called tables. One or more of a particular field within a table is called a column. A collection of related tables is called a database, and the structure of the related tables is called a schema. Data records may also be referred to as data attributes or data items or objects.

A relational database is a database where information is stored, accessed, and indexed according to specified values of the respective fields, known as a relation. The specified values include specified functions of values, such as ranges of values.

For example, a query is constructed for a relational database which is intended to retrieve only those tuples from the relational database that have a first item record conforming to a first specification in the query AND a second data item conforming to a second specification in the query, where the logical operator AND is also part of the query. Continuing the example, all of the field specifications and the logical operator AND comprise an entity called a relational query specification. In general, a relation refers to the relationship of data items or attributes within a table, or even to the table itself.

The DBMS may be transactional, allowing user operations to be performed as transactions that have well-defined properties. The properties may include an isolation property that ensures that multiple concurrent and distinct transactions operating on the database do not interfere with each other. The transaction each perceive the state of the system as if each of the multiple transactions is the sole transaction executing in the database management system.

Another transaction property is atomicity, meaning that the transaction can be aborted prior to committing any changes to the database management system. The result of aborting the transaction is no change to any record in the database.

The durability property indicates that once a transaction is committed to permanent storage, any database record changes due to the transaction remain stable even if the system restarts or a power failure or other kind of defined failure occurs.

These properties of transactions may be ensured for a database by a log file in log files 272. A log file is a data structure in which the database management system maintains a sequential record of all data modifications. A log file is used, for example, to record committed transactions and to record abort operations on uncommitted transactions.

When there are multiple users, there may be multiple local buffer caches 23 on multiple nodes. There may be several instances of query process 260 operating on one compute node, using a shared local buffer cache 23, for processing queries by different users.

All local buffer caches 23 and the permanent storage in flash memory of nodes 242, 244 must be kept logically consistent with one another. Periodic checkpoints to flush modified contents of the buffer cache to the permanent storage as checkpoints 274 may be used as one way of maintaining consistency.

Figure 11:
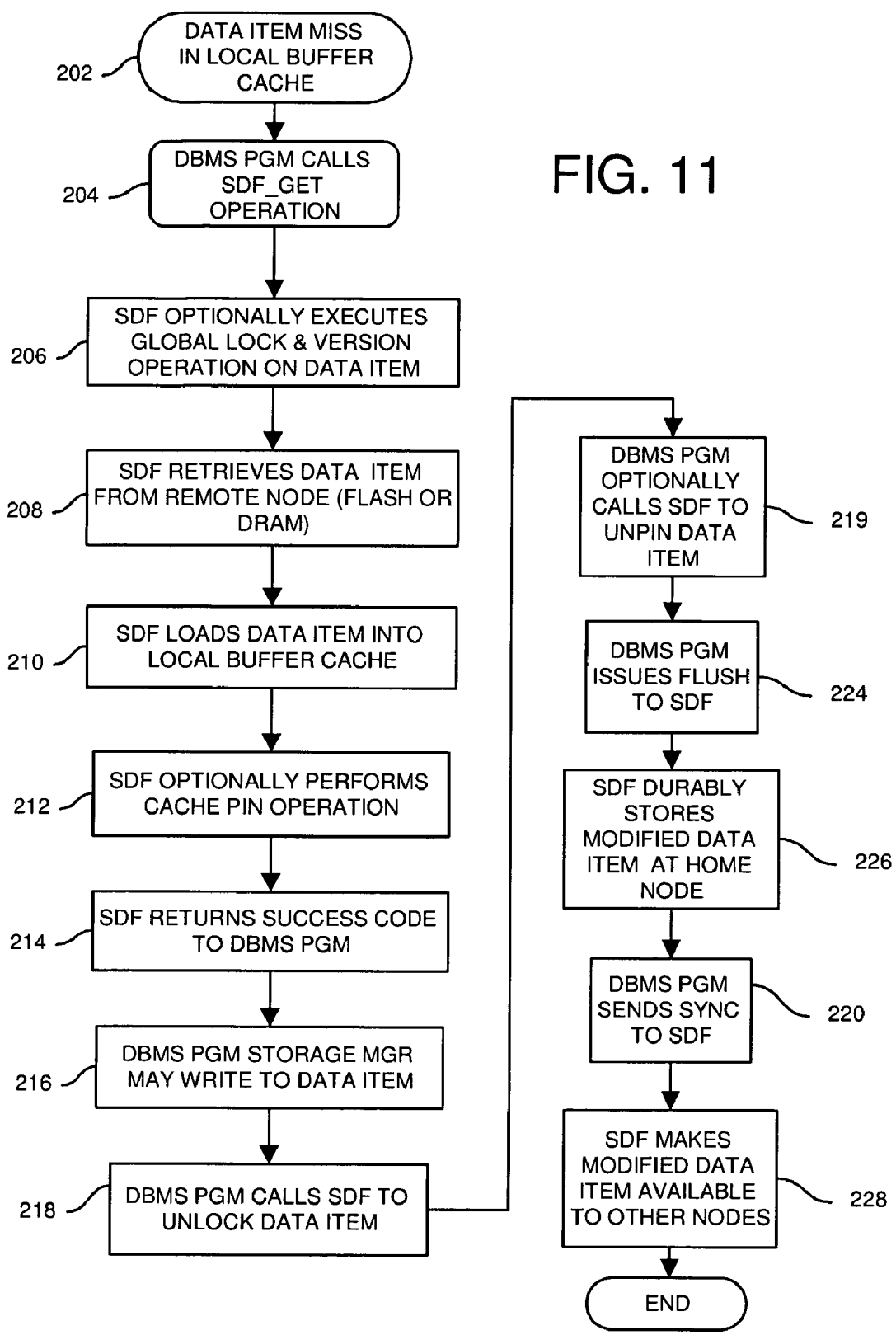
FIG. 11 is a flowchart of the SDF processing a database record miss in the local buffer cache.

FIG. 11 is a flowchart of the SDF processing a database record miss in the local buffer cache. SDF 20 (FIG. 10) is called by storage management 270 when a database record or other data item is not present in local buffer cache 23, step 202. Storage management 270 in the executing instance of DBMS program 200 uses a SDF_GET function in the SDF API to activate a SDF thread that executes on the local compute node's processor, step 204.

The SDF optionally performs a global data lock operation, step 206, in order to ensure that there is a single modifiable copy of the particular data item. The SDF_GET operation may retrieve a modified copy of the particular data item from flash memory or from a local buffer cache on another one of the nodes. A data versioning operation may also be performed to identify the most recent version of the data item, and to save a copy of the most recent version, in case subsequent modifications to the data item need to be rolled back, or un-done. Lock and version operations may not need to be performed in some instances, such as database reads, but may be needed for transactions, such as when writing to database records.

The SDF reads the requested data item from the node, such as from flash memory at a home node for a database record, or from a local buffer cache of a sharing node that has earlier cached the database record, step 208. The requested data item is then loaded into local buffer cache 23 by the SDF, step 210. The SDF may also return a pointer to the data in the local buffer cache so that DBMS program 200 has the pointer.

A cache pin operation may be performed by the SDF, step 212. A cache pin operation ensures that the particular data item remains (is pinned) in the local buffer cache. This guards against another request from this or another thread causing replacement of the data item in cache.

SDF returns a success code to the calling program, such as storage management 270 in DBMS program 200, step 214. Storage management 270 may then access the data item, step 216. Writes to the data item may be allowed.

After DBMS program 200 has finished accessing the data item, step 216, DBMS program 200 calls the SDF to unlock the data item, step 218, if that data item was previously locked in step 206. When the data item was pinned by a cache pin operation in step 212, then DBMS program 200 calls the SDF to perform a cache unpin operation, step 219.

When the data item was written in step 216, the DBMS program optionally calls the SDF to flush the modified data item back to the flash memory at its home node, step 224. The SDF then stores the modified data item at its home node, step 226. Various logs may need to be written by the DBMS program or by the SDF to ensure that this write back is durable. The DBMS program optionally calls the SDF to perform a SYNC operation, step 220, so that the modified data item is made visible to other nodes, step 228. The SDF_SYNC operation makes the results of selected previous operations including the modified data item visible to other instances of DBMS program 200' that are executing on the local node or on other compute node in the system. A global cache directory at the home node may be updated to make the modified data item visible to other nodes.

Other database operations, such as row insertions, row deletions, and index updates, are performed in a similar manner using the SDF API.

Figure 12A:
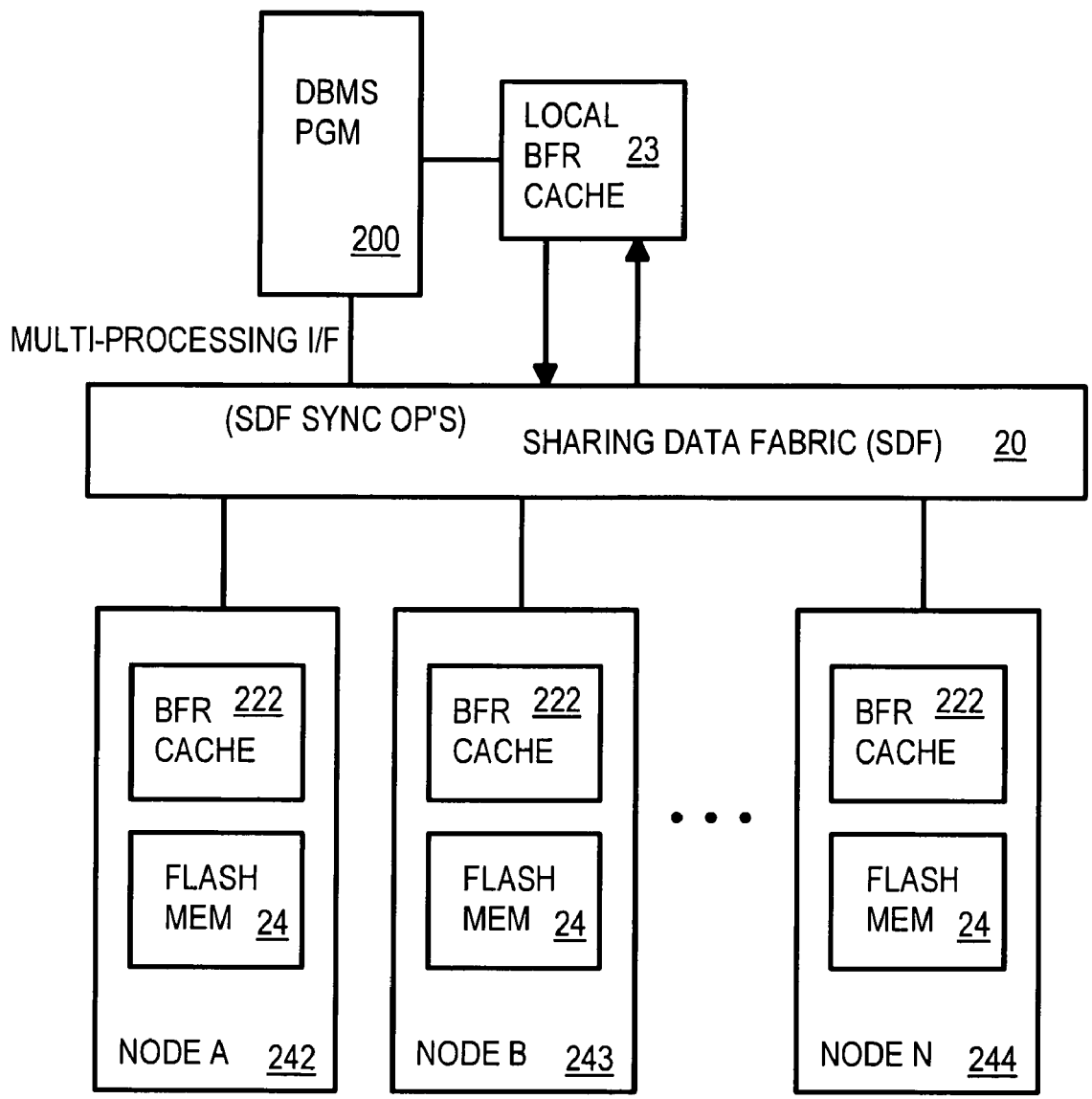
FIGS. 12A-D show several alternate interfaces to the SDF.

FIGS. 12A-D show several alternate interfaces to the SDF. In FIG. 12A, SDF 20 has an API that uses multi-processing interfaces such as SDF synchronization operations in place of synchronization primitives typically provided by a multi-processing system. The SDF API has software libraries with interfaces that are compatible with existing multi-processing interfaces, such as Symmetric-Multi-Processing SMP interfaces. Since the SDF API has functions with interfaces matching the SMP interface, programs written for the SMP interfaces require little or no modification to operate with SDF 20. The SDF synchronization operations are enabled to operate transparently across multiple nodes in a cluster. Data items stored in flash memory 24 or in buffer caches 222 of nodes 242, 243, 244 can be accessed by DBMS program 200 using these SMP-compatible interfaces that cause SDF 20 to copy the data items into local buffer cache 23, and flush modified data items back.

Figure 12B:
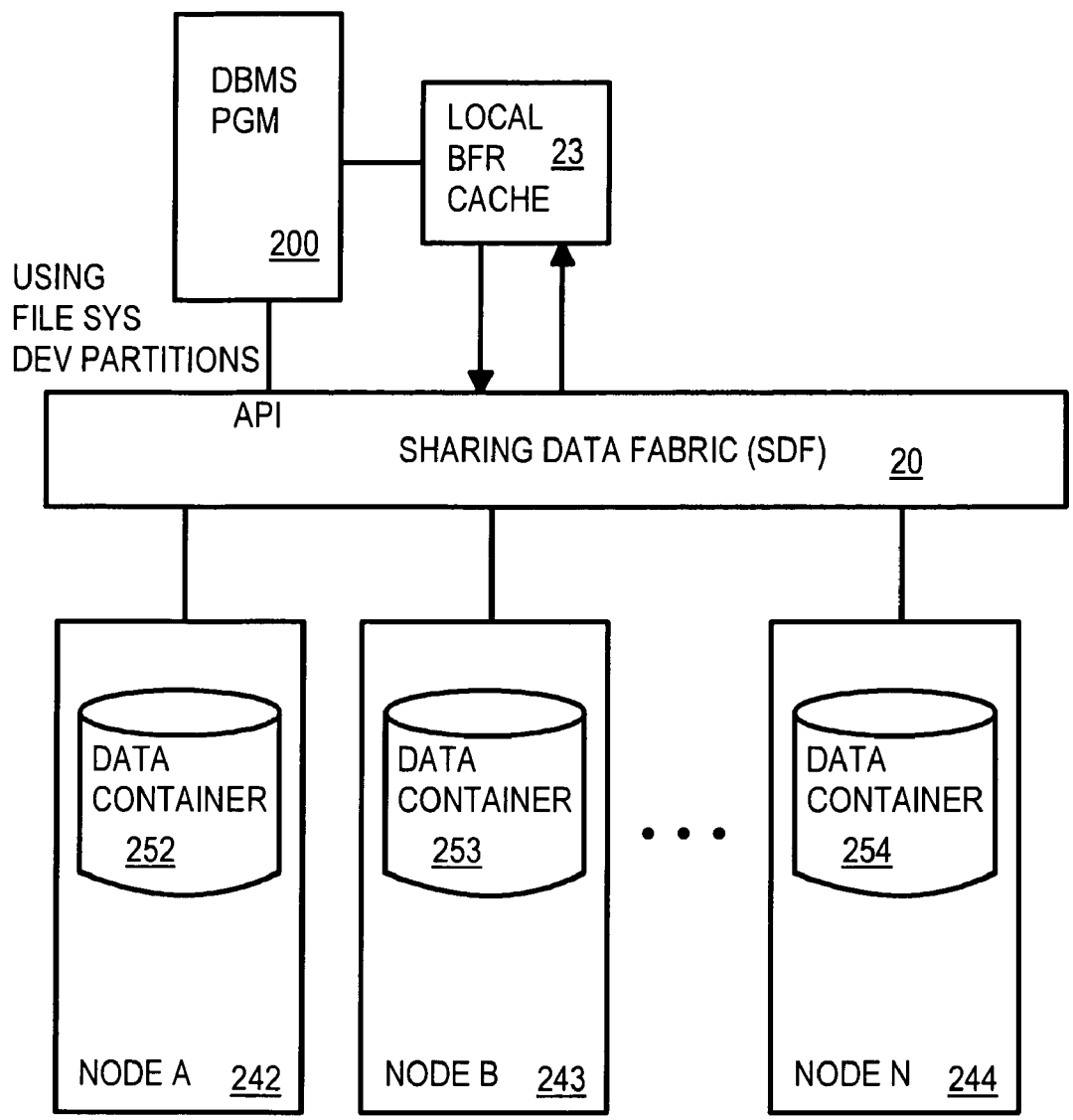

FIG. 12B shows a SDF interface that uses a file system interface. DBMS program 200 uses data containers rather than files or magnetic disk partitions. Database tables, records, or other data items are stored in data containers 252, 253, 254 on nodes 242, 243, 244, but appear to be local to DBMS program 200. DBMS program 200 is written to advantageously use functions of SDF 20 that mimic file-system functions for magnetic disk partitions, such as a lseek( ) function.

DBMS program 200 accesses data items stores in data containers 252, 253, 254 using SDF 20's API, which is compatible with existing DBMS access methods using file systems and/or device partitions. Durability and consistency of data stored in data containers may be automatically and transparently maintained by SDF 20.

Figure 12C:
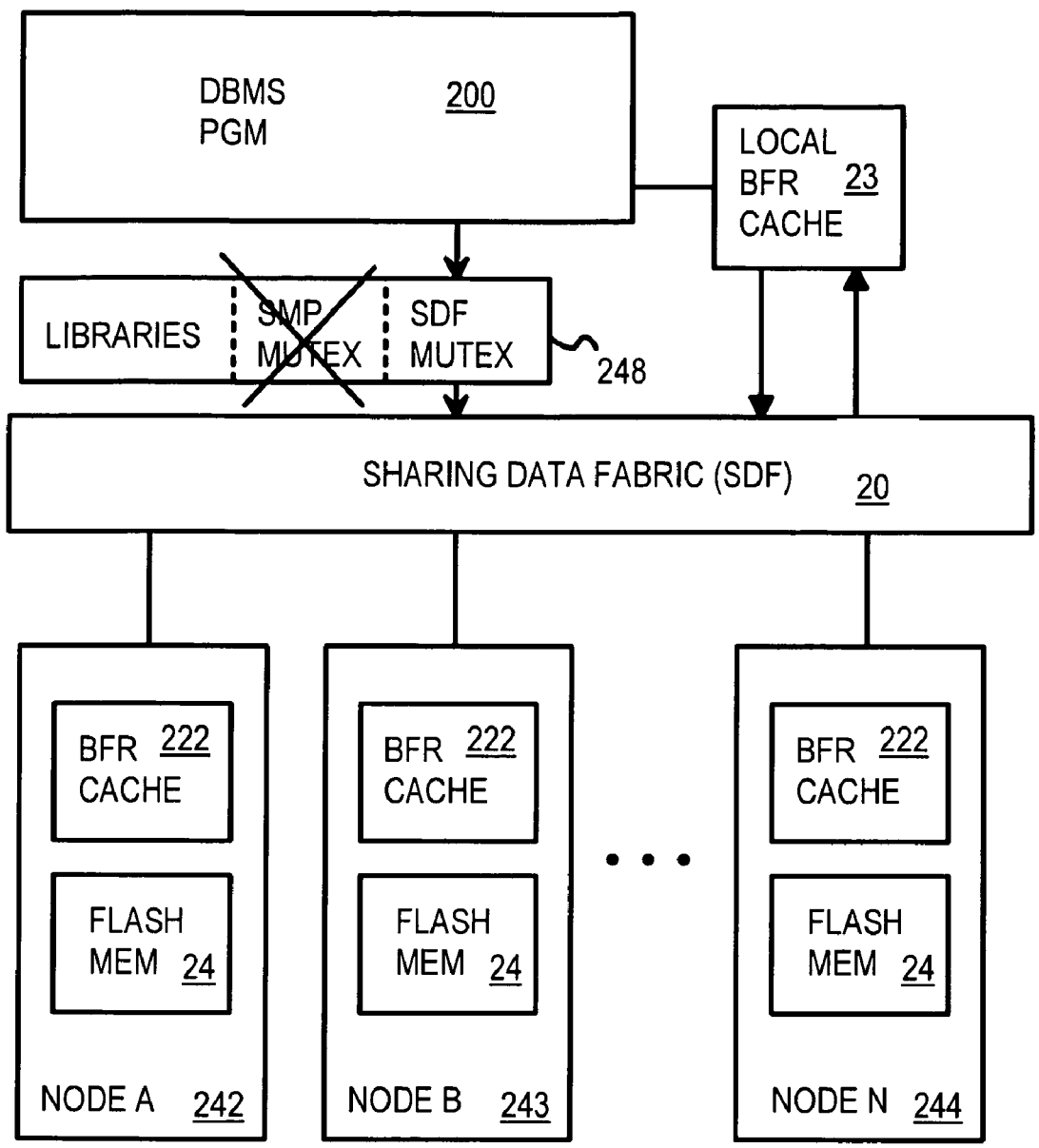

FIG. 12C shows a SDF interface using SDF MUTEX operations. Software compatibility libraries 248 that DBMS program 200 is written for include a symmetric multi-processing (SMP) mutual-exclusion (MUTEX) operation. When DBMS program 200 calls the SMP MUTEX operation in compatibility libraries 248, a SDF_MUTEX operation is called in its place. The SDF_MUTEX operation has the same list of parameters and variables in its interface, and thus is transparent to DBMS program 200.

SDF 20 allows direct substitution of data fabric primitives such as SDF_MUTEX for similar primitives such as SMP_MUTEX provided by platforms supporting a single address space. For example, SDF 20 provides a test-and-set operation which is used to create a MUTEX operation that is a direct replacement for an SMP-based MUTEX operation.

Programs written for the SMP interfaces require little or no modification to operate with SDF 20. The MUTEX synchronization operations are the enabled to operate transparently across multiple nodes in a cluster.

Figure 12D:
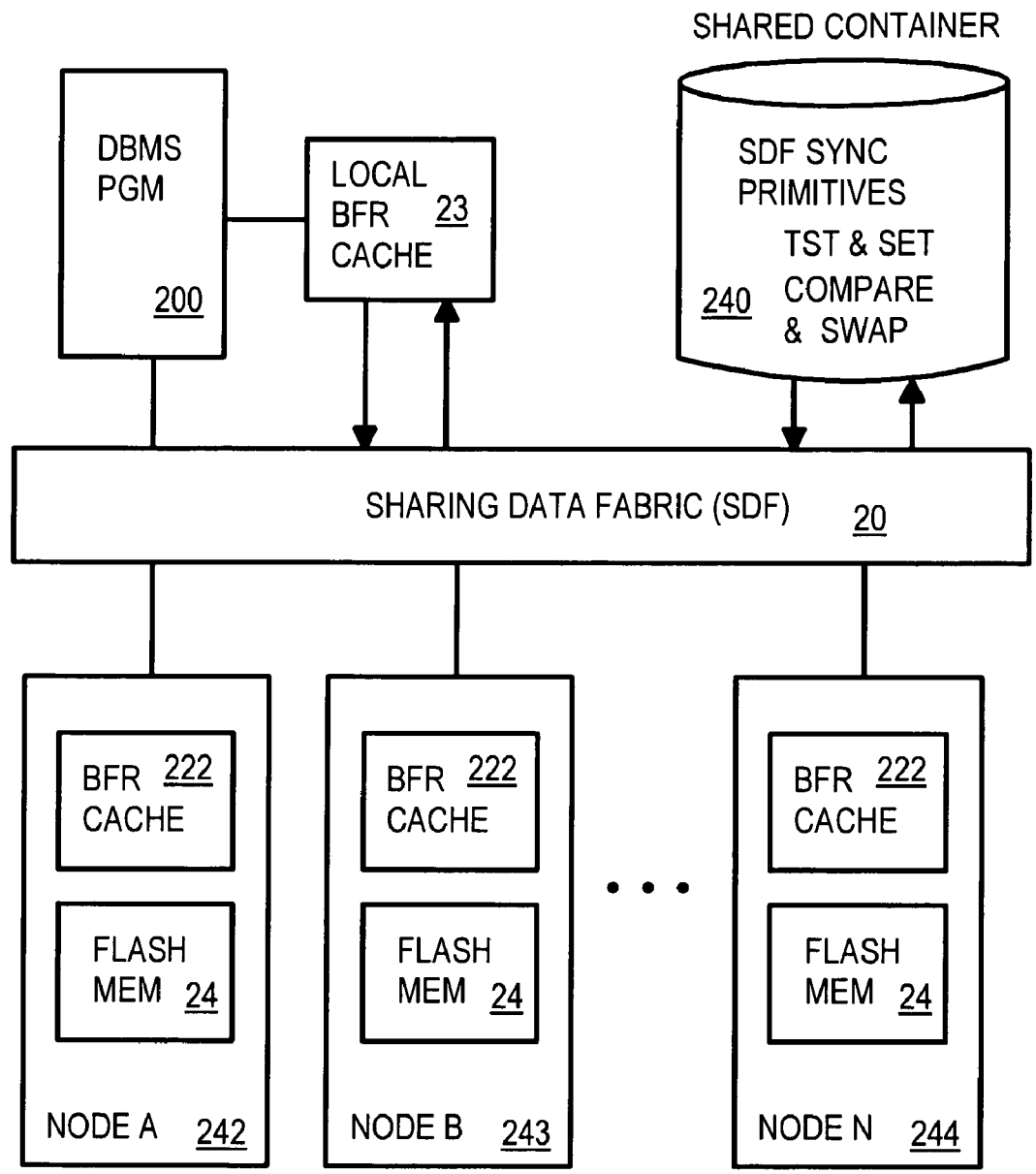

FIG. 12D shows a SDF interface using a container of synchronization primitives. DBMS program 200 is written to use synchronization primitives such as test-and-set, and compare-and-swap, which consist of multiple operations performed atomically on one or more program variables. These variables are enabled to be shared among multiple instances of DBMS program 200 by placing them into primitive operation container 240, which is shared among the multiple instances. SDF 20 allows DBMS program 200' (not shown) executing on other nodes to access primitive operation container 240.

Special synchronization operations such as test-and-set, and compare-and-swap, are implemented efficiently within SDF 20 and provided to DBMS program 200 through the SDF API, which has special compatible functions for these operations.

Since the SDF API has functions with interfaces matching the interface of these primitive operations, programs written for the primitive-operation interfaces require little or no modification to operate with SDF 20. The existing calls to the synchronization operations are redirected to use objects in the new synchronization container. The SDF synchronization operations may be enabled to operate transparently across multiple nodes in a cluster.

Figure 13:
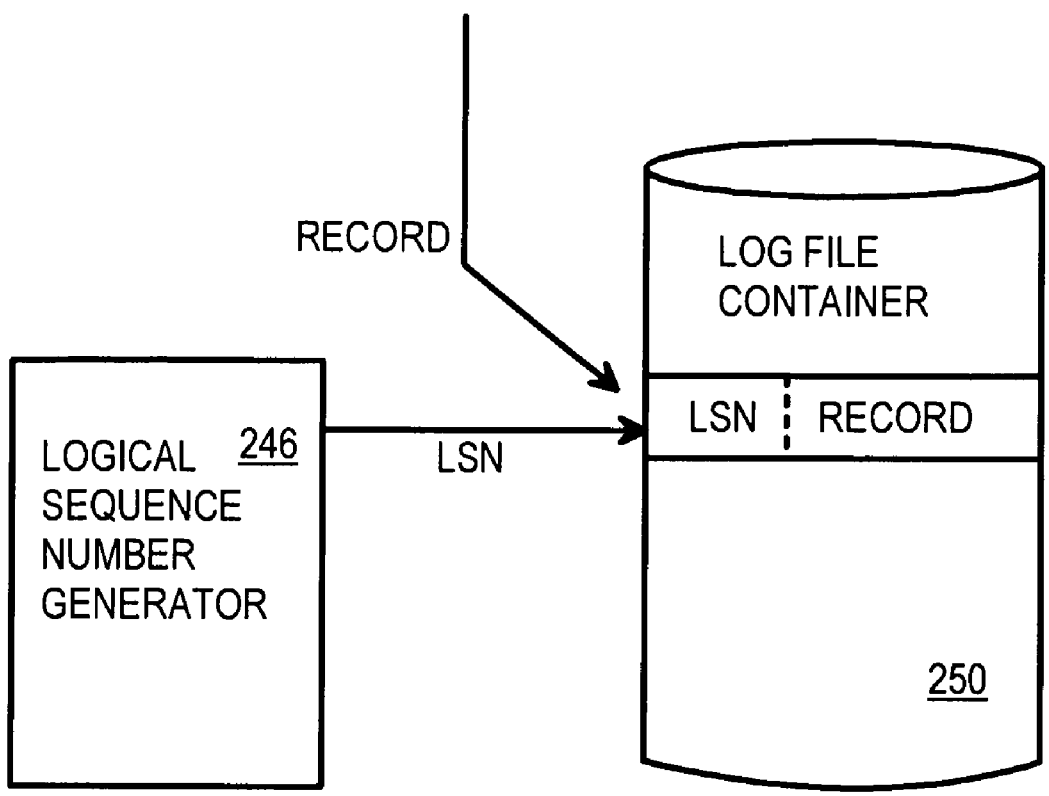
FIG. 13 shows a put record operation that puts a record in the log file for error recovery.

FIG. 13 shows a put record operation that puts a record in the log file for error recovery. SDF 20 may support distributed log file operations through log file containers. A log file container may use a special node address space for performing functions of a distributed log file. A log file container may maintain certain attributes important to log files, such as n-way replication. The log file container may allow multiple instances of DBMS program 200, 200' to commit database updates in a global order.

For example, a DBMS storage manager instance inserts a record into log file container 250. In response to a request from a transaction executing in any DBMS program instance, the DBMS storage manager instance performs a data fabric PUT RECORD operation to add a log record to log file container 250. The SDF performs the operation, updating the contents of log file container 250 and updating internal pointers. This operation may be done atomically by the SDF and be recoverable by the SDF when failures occur in the hardware or software.

The SDF may perform replication operations to replicate the updated record, and wait for the log record to be permanently stored before returning a success code to the DBMS storage manager instance. Each PUT RECORD operation may be associated with a Logical Sequence Number (LSN) from LSN generator 246. DBMS program 200, 200' is able to subsequently use the LSN to retrieve the respective log record should a database recovery or rollback operation be necessary. Various techniques for logging and recovery may use the log file container 250.

Figure 14:
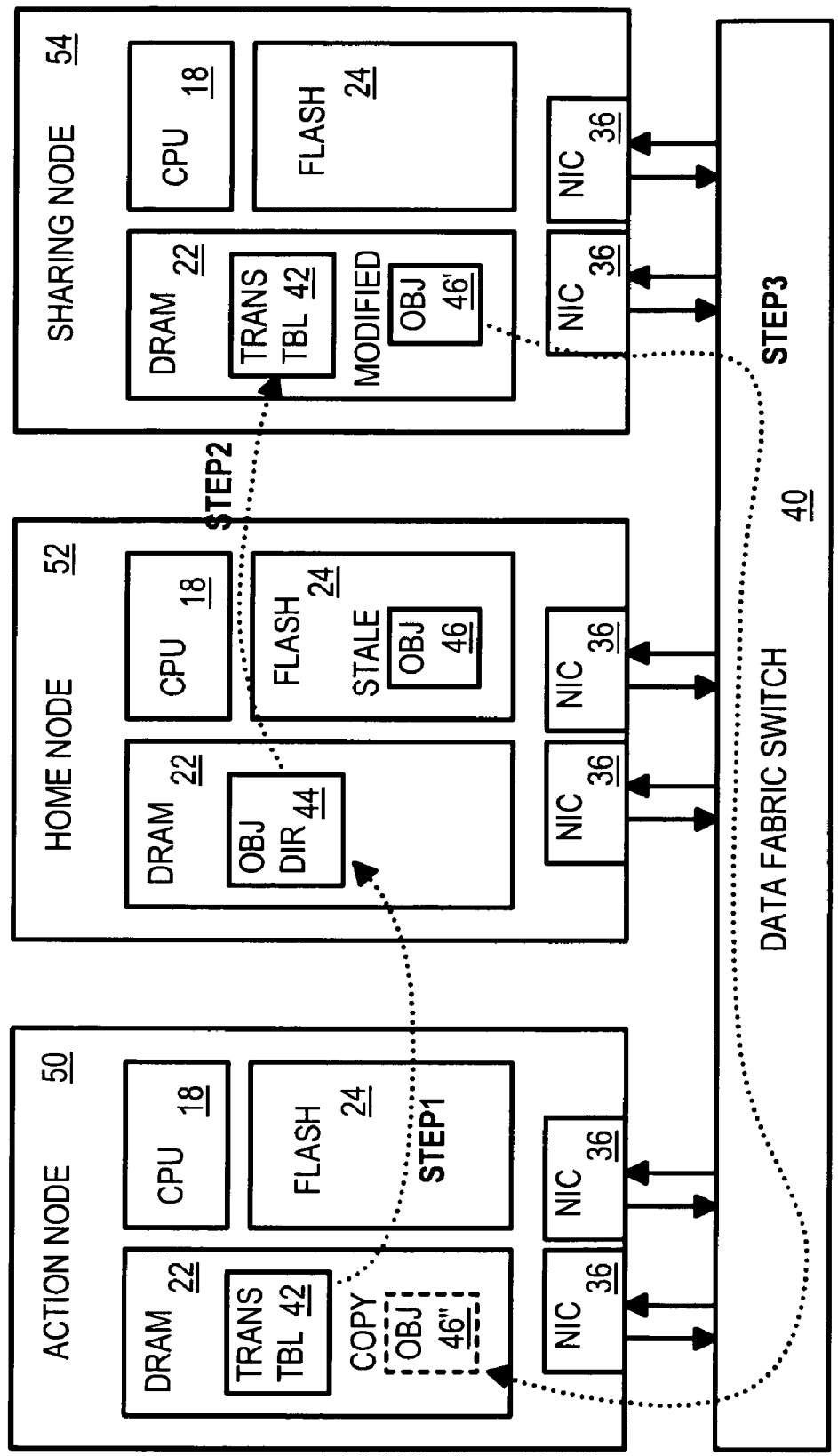
FIG. 14 shows an action node requesting a database object from a home node that fetches a modified object on a sharing node using transaction tables and an object directory.

FIG. 14 shows an action node requesting a database object from a home node that fetches a modified object on a sharing node using transaction tables and an object directory. A node may operate as one or more of a home node, an action node, or a sharing node for any particular object. Objects include database records or other data items associated with a database.

Home node 52 is the permanent location of object 46 in flash memory 24. Action node 50 is executing an application program that requests an object. Sharing node 54 has a copy of the object in its object cache in DRAM 22.

A program executing on action node 50, such as executing instances of DBMS program 200 (FIG. 10), requests access of object 46. Object 46 is not yet present in DRAM 22 of action node 50, so the SDF determines the object's home node, such as by hashing the object's name or identifier or looking up the object in a table.

Transaction table 42 is stored in DRAM 22 of action node 50 and eventually contains information to identify home node 52. In response to a request from action node 50 to access object 46, the SDF on home node 52 looks up the object in its object directory 44. Object directory 44 indicates that although object 46 is present in flash memory 24 of home node 52, this object 46 is stale. A modified object 46' is present in DRAM 22 of sharing node 54 in this example.

Since modified object 46' is more current than stale object 46 in flash memory 24, SDF on home node 52 sends a message to SDF on sharing node 54. This message causes transaction table 42 on sharing node 54 to be checked to make sure that modified object 46' is not locked for use by a program executing on sharing node 54. If modified object 46' is locked, action node 50 waits until the lock is released. Release of the lock causes an update of transaction table 42 on sharing node 54.

When transaction table 42 indicates that modified object 46' is unlocked, SDF on sharing node 54 sends the object data of modified object 46' over data fabric switch 40 to action node 50. Object copy 46" is created in DRAM 22 on action node 50. The requesting program on action node 50 can now access object copy 46".

Other steps may be performed to update object directory 44 and stale object 46 in flash memory 24 on home node 52, although this may be delayed to allow home node 50 to update object copy 46" to reduce the number of writes and operations to flash memory 24.

Figure 15:
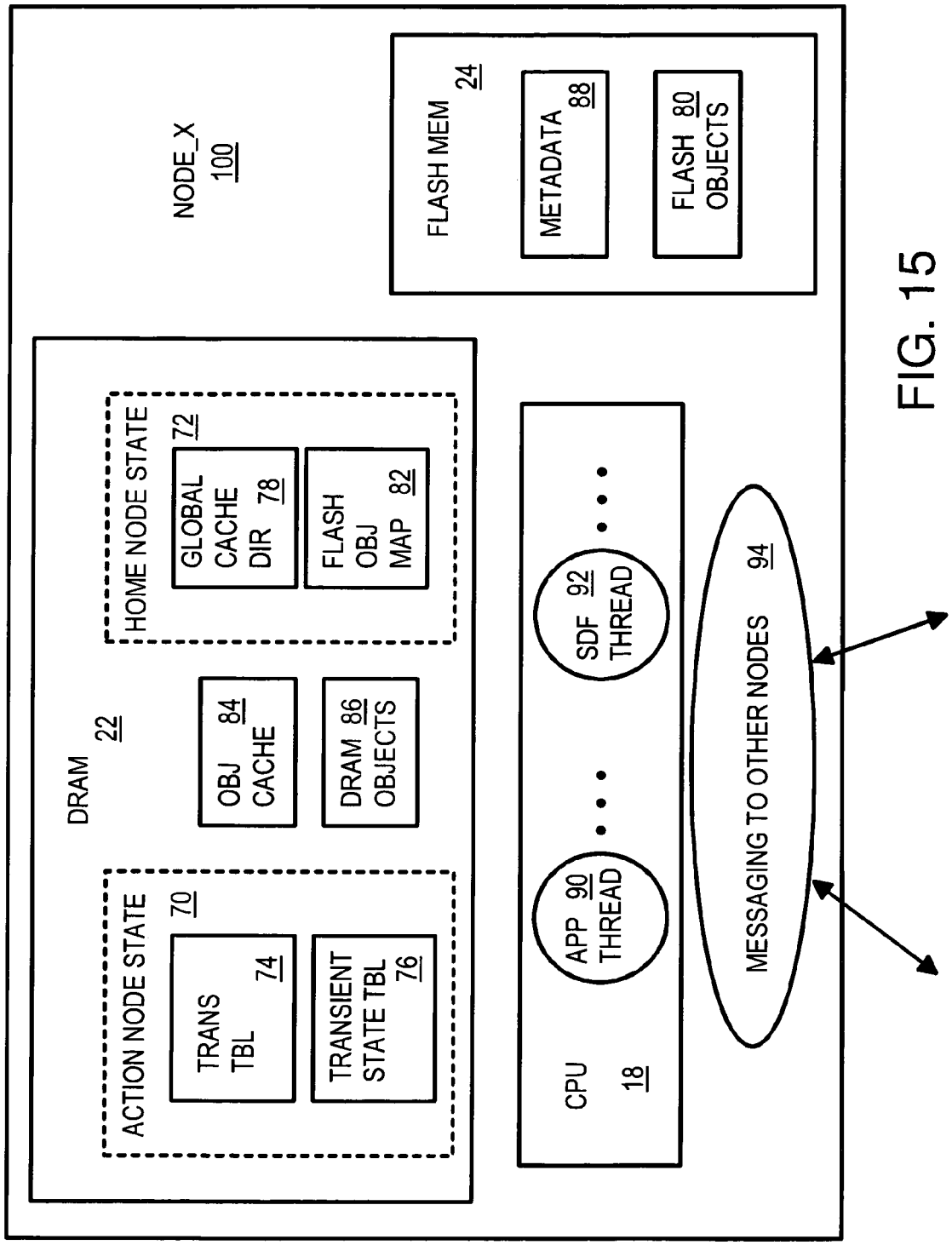
FIG. 15 is a snapshot state diagram of a compute node that can act as an action, home, or sharing node for a distributed database program.

FIG. 15 is a snapshot state diagram of a compute node that can act as an action, home, or sharing node for a distributed database program. Node 100 is one of compute nodes 114 of FIG. 7, with hardware such as detailed in FIG. 6.

Node 100 has threads running on processor 18, including application thread 90 and/or SDF thread 92. Application thread 90 can be an executing instance of DBMS program 200 on local node 100.

Messaging 94 allows SDF thread 92 to send and receive messages from other nodes. Messaging 94 may use software and hardware such as interconnect 110 of FIG. 7, NIC's 36 of FIGS. 6, 9, and other hardware such as switches.

Node 100 includes DRAM 22 and flash memory 24. The DRAM state shown is a snapshot of the contents of DRAM 22 at a particular point in time, while the flash state is a snapshot of the contents of flash memory 24 at approximately that same time.

Flash memory 24 at each node stores flash objects 80, which may be grouped into containers. A flash object may be uniquely addressable in the SDF using a container-identification and an object identifier. Metadata 88 stored in flash memory 24 may include container metadata and global metadata. Container metadata describes the attributes or properties of objects in a container (such as a number of replicas for the container). Global metadata may include virtual-to-physical node-identification mappings and/or hash functions. The hash function is performed on the object's name to generate an identifier that can be used in further table lookups to locate the object using a global map.

Object cache 84 in DRAM 22 stores copies of objects that are also stored in flash memory 24 of the home node, which may be node 100 or may be another node. DRAM objects 86 are objects that have node 100 as their home node, but the object's attributes specify that the object primarily resides in DRAM 22 rather than in flash memory 24. For example, frequently-accessed objects such as database indices 266 of FIG. 10 may be selectively enabled to remain in DRAM 22 rather than the flash memory to improve look-up performance.

DRAM 22 also stores state information for particular classes of nodes. Action node state 70 stores state information for objects using node 100 as the action node, while home node state 72 stores state information for objects using node 100 as their home node, such as DRAM objects 86 and flash objects 80.

A home node is a well known, an authoritative source of the object, which resides in DRAM, flash memory, or another component in the storage sub-system. While an object may be cached and/or replicated in DRAM and/or flash memory at several nodes, only one of these nodes (at any one time) is considered to be the home node for that object. An action node stores a transient copy of an object. The action node usually obtains a copy of the object from the home node. Node 100 can operate as the home node for some objects, and as the action node for other objects.

Transaction table 74 in action node state 70 stored in DRAM 22 has entries to track transactions. Transaction table 74 keeps a list of all objects accessed (touched) during a transaction, and may keep a copy of the object's initial state when the object is modified, or a pointer to a log of changes from an initial state that is archived. The initial state pointed to by transaction table 74 aids in object recovery if an abort occurs. Transaction table 74 provides recoverability for threads of applications and SDF services that execute on the node's processor. There may be links between tables, such as links in entries in transaction table 74 to entries in transient protocol state table 76.

A transaction is a series of operations. The transaction as a whole succeeds as a unit or the transaction and all operations in the transaction are aborted. This may also be referred to as an atomic set of operations. In a transactional system that maintains isolation among concurrent transactions, there are no unexpected effects from an aborted transaction since either all operations in the transaction are executed completely, or any partially-executed operations of the transaction are aborted without visible side effects. Transactions are extremely useful for distributed database programs, since a database record may be updated as a transaction, preventing a partial update of that database record.

Transient protocol state table 76 in action node state 70 stored in DRAM 22 has entries to track outstanding requests. The requesting thread, type of request, request status, and order of requests from each thread are stored in this table, which is shared by all threads at node 100.

Home node state 72 stores information for objects that have node 100 as their home node, and are thus stored (homed) in DRAM 22 (as DRAM objects 86) or flash memory 24 (as flash objects 80) of node 100. Home node state 72 in DRAM 22 stores a sharing list within global cache directory 78, and flash object map 82. Global cache directory 78 stores the state of all objects that have node 100 as their home node and have been cached in one or more nodes in the system. The state of the object in global cache directory 78 is one of shared, modified, invalid, and either locked or unlocked. An indication of whether the object is being accessed within a transaction may also be stored in global cache directory 78. The locations of cached copies at other nodes, and the state and progress of any coherency operations for the objects are also kept in global cache directory 78.

Flash object map 82 maintains a map between an object identifier and its location in flash memory 24. Flash object map 82 may store an address, a partial address, or an identification of the location of the object in flash memory 24. Flash object map 82 maps at least a portion of a respective identifier of a particular one of the objects to a physical location in flash memory 24. Flash object map 82 has entries for all flash objects 80 that belong to this home node, regardless of whether that object is cached at any node. Flash object map 82 may be a homed object map that also has entries for all DRAM objects 86 at this home node.

Database Transaction Flows Using SDF—FIGS. 16-19

Snapshots of the states and movements of database objects and SDF messages among two nodes in a multi-node shared flash memory system are shown in the examples of FIGS. 16-19. Snapshot diagrams, similar to that of FIG. 15, are shown for action node 50 and home node 52.

Extensions of these flows could involve sharing node 54 (FIG. 14) when sharing node 54 contains a modified copy of the requested object. Then the requested object is sent from sharing node 54 rather than from home node 52, since the flash object at home node 52 is stale. Messages passed among these nodes, including the database object being copied, are shown by the arrows.

These examples are for operations that are part of transactions. To provide ACID properties to executing instances of DBMS program 200, 200', operations that access database records are organized as transactions. Transactions allow the operations of a transaction to be committed together as an atomic unit, preventing partial updates of database records that can corrupt the database. Operations that are not part of transactions could also be used for less important accesses, such as status inquiries or database reads. When a requested object is already present in object cache 84 of action node 50 (a hit), application thread 90 may simply read the object from object cache 84.

Figure 16:
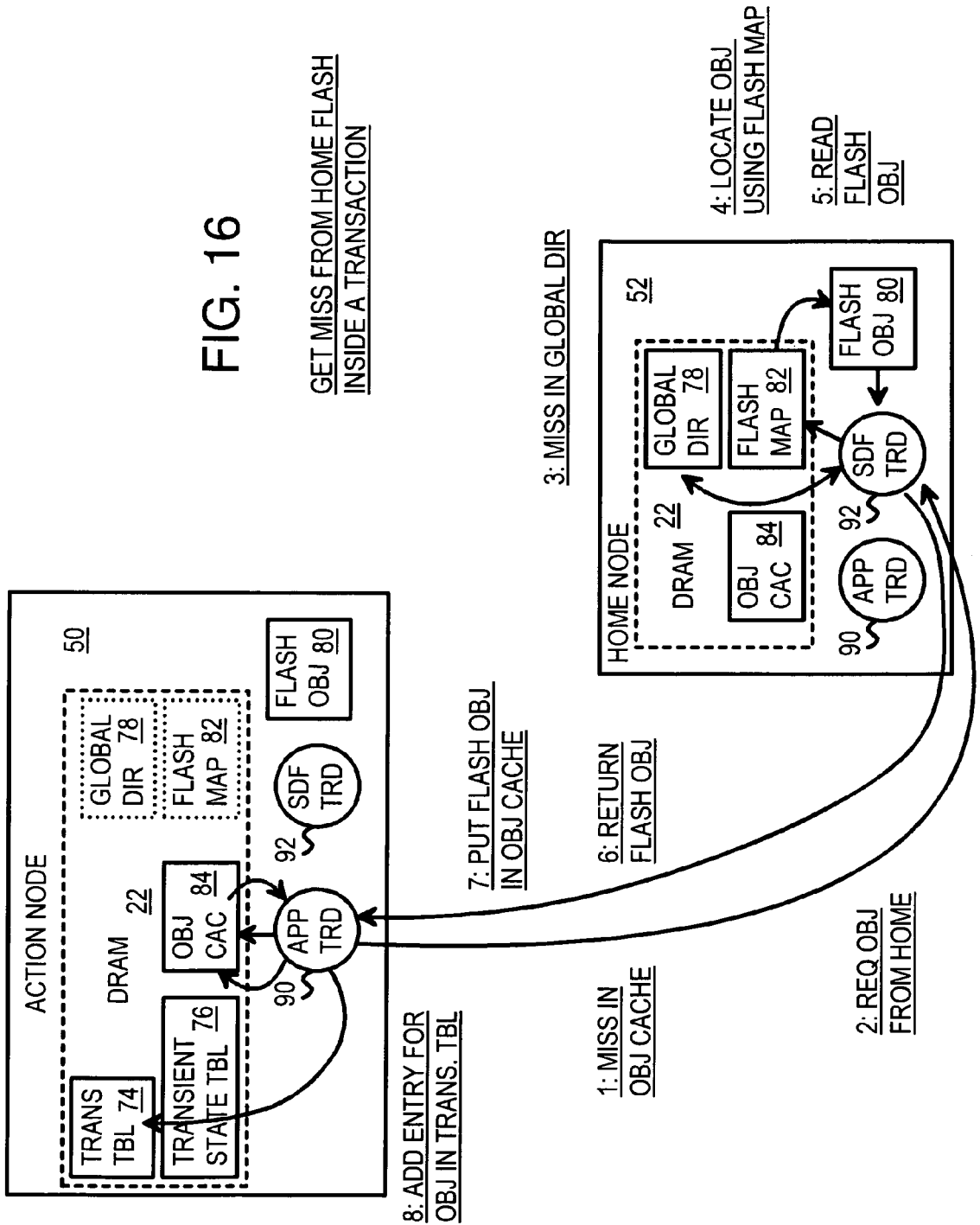
FIG. 16 shows a get operation inside a transaction that misses in the object cache of the action node, and fetches the object from flash memory of the home node.

FIG. 16 shows a get operation of a transaction that misses in the object cache of the action node, and fetches a requested object from flash memory of the home node. A miss occurs when application thread 90 checks its local DRAM object cache 84. The node that application thread 90 is running on is referred to as action node 50 since actions are being performed at this node. A request is sent from the action node to the home node for the requested object. The location of home node 52 is determined by action node 50, such as by hashing the name of the object being requested and using the hash as an address in lookup tables. The lookup tables may be a global map from identifiers of the objects to home nodes of the objects.

Application thread 90 uses the address or identifier for home node 52 to send a message to home node 52. This message requests the object from home node 52. At home node 52, the message received from action node 50 activates SDF thread 92, which looks up the object identifier in global cache directory 78 at home node 52. In this example, no copies of the object have been cached by any other nodes, so a directory miss occurs.

SDF thread 92 running on home node 52 then looks up the object identifier in flash object map 82 to find the address of the object in flash memory 24 of home node 52. Flash memory 24 is read to copy flash object 80 stored in the flash memory of home node 52. A copy of flash object 80 is sent from SDF thread 92 at home node 52 to application thread 90 at action node 50 via an interconnect between home node 52 and action node 50. Application thread 90 (or a SDF miss-handling thread such as SDF thread 92 on action node 50 invoked by application thread 90) then loads the copy of the object into object cache 84 at action node 50.

Transaction table 74 is updated to include an entry for the copy of the object that was just loaded into object cache 84. This entry identifies the current transaction that requested the object. At the start of a new transaction, application thread 90 can create a new entry in transaction table 74, and this entry is updated with a list of objects touched by the transaction as the transaction is processed, or with pointers to sub-entries for each object in that transaction. Application thread 90 can resume processing the transaction and read the object copy in its object cache 84.

Figure 17:
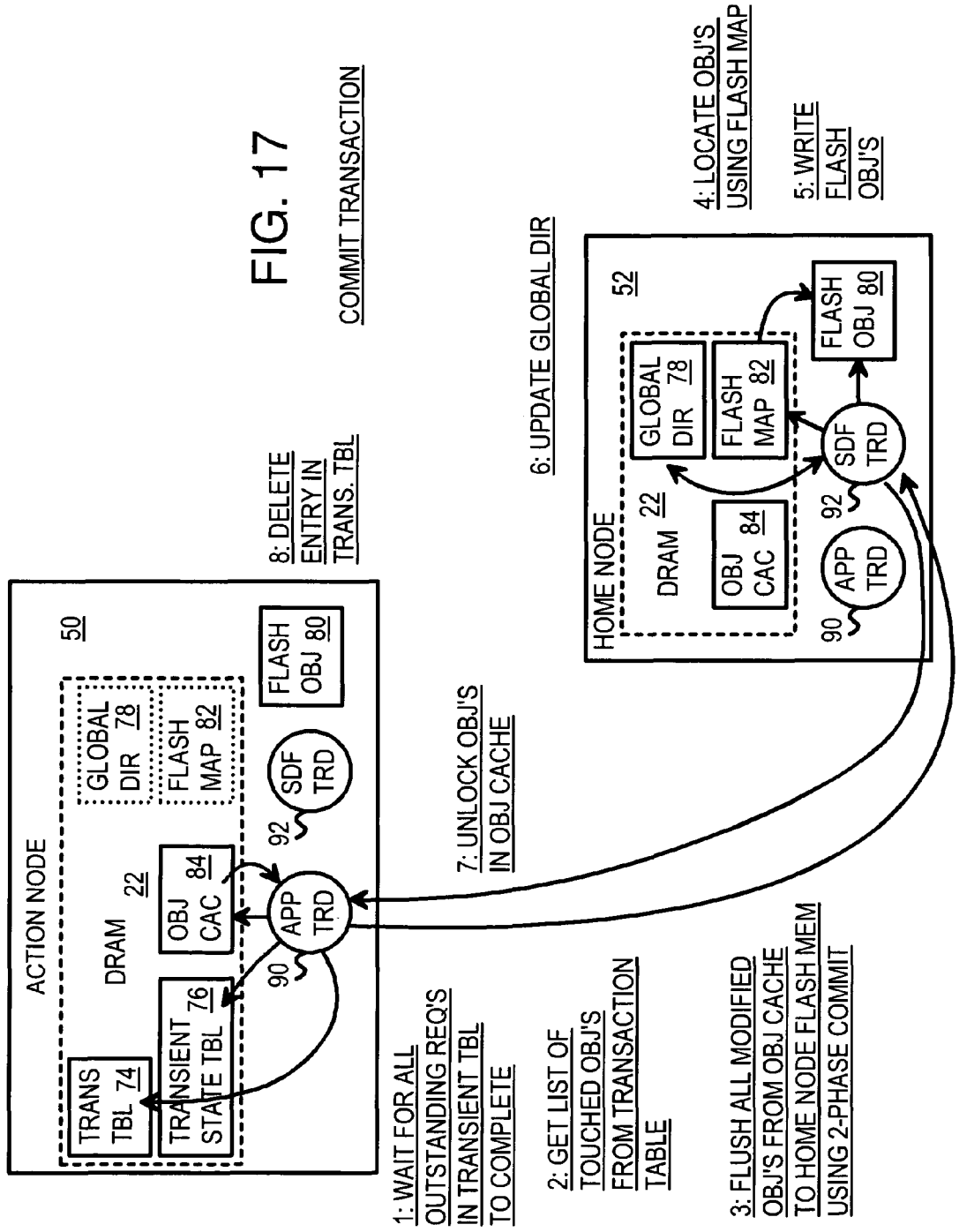
FIG. 17 shows a commit transaction operation.

FIG. 17 shows a commit transaction operation. Once all of the operations in a transaction have been started and are nearing completion, the transaction ends using a commit transaction operation as shown in FIG. 17. The commit transaction operation ensures that all operations of that transaction have been successfully completed before any modified objects such as updated database records are committed to persistent memory. Thus the transaction is committed as a whole, all-or-nothing. All objects modified by the transaction are updated, or none are updated.

When application thread 90 reaches a commit transaction operation, application thread 90 reads transient protocol state table 76. Transient protocol state table 76 contains a list of all outstanding requests for all prior threads at action node 50, the status of all requests, and the order of requests for each thread. Application thread 90 waits until completion of all outstanding requests for the current transaction for application thread 90. If there are any dependencies among threads, application thread 90 must wait for completion of dependent requests at other threads, according to any ordering rules.

Once all dependent outstanding requests have completed, as indicated by transient protocol state table 76, application thread 90 reads the transaction's entry in transaction table 74. A list of all objects touched by that transaction is read from transaction table 74. Objects that were only read do not need to be copied back to the home node, but modified (dirty) objects do need to be copied back.

Each of the modified objects for this transaction are sent back to their respective home nodes, or flushed. A flush operation causes a cached object to be sent to home node 52 in order to synchronize the most up-to-date state of the object with the source. A flush to the object source in flash-memory provides persistence and a level of durability to the object state.

A flush may not require that flash memory is immediately written with the modified object. Instead, the modified object may be stored in DRAM or a write buffer on home node 52 when the flush is completed. Later, home node 52 may perform the actual writing of the modified object to flash memory.

A two-phase commit may be used to avoid contentions with other nodes that may also be accessing one of these objects at about the same time. Action node 50 may in a first phase indicate a desire to write a modified object back to the home node, and receive a timestamp, and then in a second phase actually write the modified object if there are no objections from other nodes. If another node objects, such as by also indicating a desire to access the same object, the timestamps can be compared, and the node with the earlier timestamp wins.

After the two-phase commit process has succeeded, SDF thread 92 on home node 52 locates the homed object inside flash memory using flash object map 82, and the modified object from action node 50 is written into flash memory as one of flash objects 80. Global cache directory 78 may first be consulted to verify that no other nodes have this object, and invalidations may be sent to any sharing nodes.

Global cache directory 78 is updated to indicate that action node 50 no longer has this object locked. SDF thread 92 on home node 52 sends a message to action node 50 to unlock the modified object that was just updated at home node 52, and application thread 90 on action node 50 unlocks the object in object cache 84. The object could be deleted from object cache 84, or changed from modified to shared, and changed to the unlocked state to indicate that this object cannot be written until a new lock is obtained form home node 52.

The transaction's entry in transaction table 74 is deleted once all modified objects have been successfully flushed to their home nodes, and unlocked in object cache 84. The transaction in finished and has been committed.

If any modified object cannot be written back to its home node, such as if the home node crashed, then the transaction being committed must be aborted. Any modified objects that have already been written back to their home nodes must be restored to their initial conditions. Log files may be used to recover from this rare situation.

Figure 18:
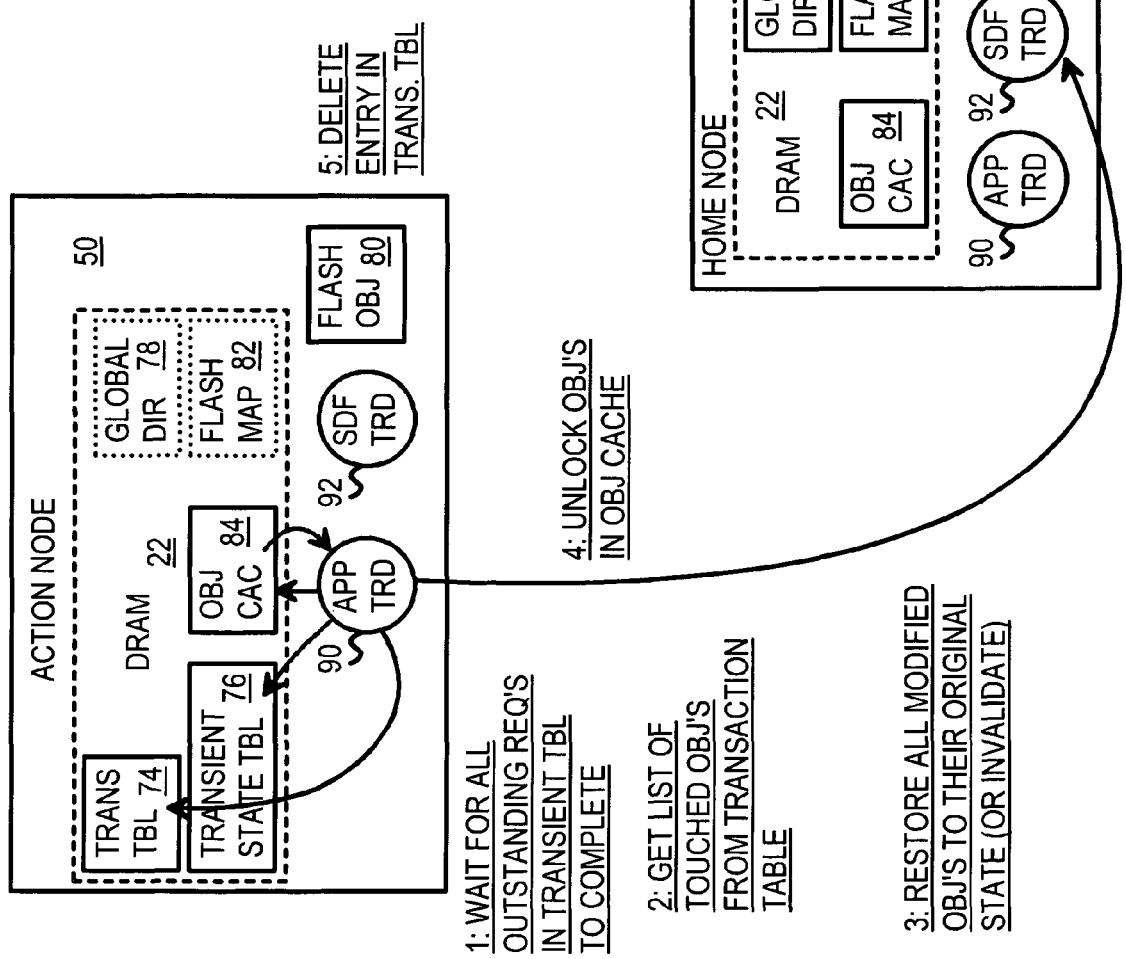
FIG. 18 shows an abort transaction operation.

FIG. 18 shows an abort transaction operation. Sometimes, one of the operations inside a transaction cannot be completed, or has an unsuccessful return code, perhaps after several retries. A requested object may be locked by another node and unavailable, and that other node may have crashed or locked up, preventing release of the requested object. An abort transaction operation may then be performed.

Application thread 90 reads transient protocol state table 76 and waits for all outstanding dependent requests that are ordered before this transaction to complete. Then transaction table 74 is read to obtain a list of all objects touched by the transaction being aborted. Transaction table 74 contains the initial states of all objects in the transaction, or pointers to these states, or other information that allows the initial states to be obtained or generated. For example, the initial state of an object may be stored on the home node of that object.

All touched objects in this transaction are restored to their initial state at the beginning of this transaction, such as by restoring objects in object cache 84 using the initial states from transaction table 74. Alternately, each of the touched objects may simply be invalidated in object cache 84.

Restored objects in object cache 84 that were locked by the aborting transaction are unlocked, with an unlock message being sent to the home node for each object being unlocked. Home node 52 updates global cache directory 78 to indicate that the object is unlocked. Other nodes may now access the object. Once all restored objects have been successfully unlocked, the entry for the aborting transaction can be removed from transaction table 74.

FIG. 19 shows sync, transaction start, and lock operations. A transaction start operation creates a new entry in transaction table 74 at action node 50. A copy of all objects that will be touched by the new transaction are stored in transaction table 74 or otherwise archived to allow rollback to this initial state should the new transaction later be aborted.

A sync operation, such as an SDF_SYNC, is performed to synchronize application thread 90 with other threads on action node 50 or on other nodes. Application thread 90 (or SDF thread 92 if called by application thread 90 to perform the sync) reads transient protocol state table 76, which has an ordered list of all outstanding requests for all threads at action node 50, and the status of those requests. Application thread 90 waits until all outstanding dependent requests have completed.

The sync operation uses a set of ordering rules to determine which outstanding requests must be completed prior to the sync operation completing. In some embodiments, each sync operation is enabled to select the ordering rules it uses. In a first example, a sync operation executed by an application does not complete until all outstanding operations of the application have completed. In a second example, a sync operation does not complete until all outstanding write operations of a particular transaction have completed. In a third example, a sync operation does not complete until all outstanding operations of the action node performing the sync operation have completed.

Once all outstanding requests, as determined by the ordering rules in use, have completed, the sync operation is completed. Application thread 90 can resume having synched to other threads.

A lock is requested before application thread 90 writes to an object that has already been loaded into object cache 84 on action node 50. Once locked, other nodes cannot write that object.

Application thread 90 sends a lock request message to home node 52. SDF thread 92 on home node 52 looks up the object's entry in global cache directory 78 and waits until the object is available and not locked by any other thread on any node. Once the object is free, SDF thread 92 on home node 52 returns the lock to action node 50.

An ordered queue may be used to process lock requests at home node 52. In addition to basic mutex-like single state locks, read-write, and upgrade locks, various complex sets of locks may also be implemented (e.g. multi-granularity and hierarchical locks).

Alternate Embodiments

Several other embodiments are contemplated by the inventors. For example, while PCIe switch 30 has been described, other local buses could be used, and switch 30 could be a HyperTransport switch rather than a PCIe switch. Multi-protocol switches or multiple switches or hubs could be used, such as for supporting HyperTransport and PCIe on the same node. Data fabric switch 40, PCIe switch 30, and interconnect 110 may have overlapping hardware or software and operate to allow messages to pass for SDF.

Rather than using a local-bus switch, other network topographies could be used, including rings, chains, hubs, and links. Although flash memory has been described, other solid-state memories could be used for storing the objects at the home node (homed objects), such as phase-change memory, ferroelectric random-access memory (FRAM), Magnetoresistive RAM (MRAM), Memristor, Phase-Change Memory (PCM), Silicon-Oxide-Nitride-Oxide-Silicon (SONOS) memory, Resistive RAM (RRAM), Racetrack memory, nano RAM (NRAM), and other non-mechanical non-volatile memories. Flash memory uses electrically-erasable programmable read-only memory (EEPROM), although other technologies such as Phase-change-memory (PCM) may be substituted. NAND flash memory may be used to provide advantages in performance, such as write bandwidth, compared to other non-volatile, electronic memory types. Additional levels of storage hierarchy could be added, such as hourly, daily, or weekly backups to disk, tape, or optical media. There could be many flash modules or only one flash module.

While the description above described the global, shared flash memory as being accessible in one global shared address space, in other embodiments, the global, shared flash memory is accessible in a plurality of global address spaces. For example, in some embodiments, each container is accessible by a respective address space.

The Sharing Data Fabric (SDF) is a unified user-space mechanism to access and store data into hierarchical DRAM, flash memory and the storage sub-system of a clustered or distributed set of compute nodes. SDF uses user-defined attributes to control access, consistency, duplication, and durability of objects in storage. To each application executing on any compute node, the distributed data and storage appears to be logically one big device with integrated cache, memory and storage.

The layers of software and hardware in FIG. 5 may use various combinations of hardware, firmware, middleware, drivers, software, etc. and the layers may be modified in various ways. The connections and interfaces between layers and components may also vary from the simplified diagrams of FIGS. 5, 6. Executing instances of DBMS program 200, 200' may operate on multiple nodes, with one instance per node, or many instances per node. Several query processors could share a common storage management 270, or each query processor could have its own storage management 270. Many other arrangements and partitionings of blocks are possible. DBMS 200 may be substantially unmodified, yet be relinked or use a different library, or may change some routine names, and may changing how locking is done.

When transactions are not supported or used, transaction table 74 and (optionally) transient protocol state table 76 may be omitted. Other tables, lists, or data structures may be used to track SDF operations at the action and home nodes. Tables may contain entries in table format, or as linked lists, or in other formats, and can be flat, hierarchal, multi-level, or in a variety of other formats. Global cache directory 78 may contain sharing lists with or without other information.

Transient protocol state table 76 in action node state 70 stored in DRAM 22 has entries to track outstanding requests. Rather than storing information on threads, information on contexts may be stored in state table 76. The requesting context, type of request, request status, and order of requests from each context are stored in this table, which is shared by all contexts and their threads at node 100. An indirection of "context" is used to link a sequence of activity of gets, puts, etc. An application thread can use multiple contexts, or multiple threads can use one context. Application threads cannot see any SDF related tables, only SDF protocol threads can. By using contexts, monitoring of what application thread is calling which SDF calls is not needed. This makes the API more flexible.

For FIGS. 16-19, an asynchronous messaging model could be enabled by activating a receiving SDF thread 92 at action node 50 when a message returning an object copy is received from home node 52. Then the return arrow would go to SDF thread 92 rather than to application thread 90 at action node 50.

In this variation, receiving SDF thread 92 then loads the object copy into object cache 84 of action node 50 and application thread 90 can use the object copy. This handoff using the receiving SDF thread isolates application thread 90 from the details of MPI messaging and may improve robust multi-threaded execution.

While a database program requesting an object has been described, other kinds of programs such as networked services, applets, proxies, clients, servers, etc. may request objects and operate in a manner similar to that described for application programs 122. Each node could run one application program such as a server application, or multiple programs of the same or differing types. These programs may themselves perform some caching of data. Some applications or networked services may bypass SDF and reach the network interface directly, or may do so for some kinds of accesses that do not require SDF. Other kinds of API calls and network procedures or calls may be used than those listed in FIG. 8, and additional API functions may be added. Different kinds of messaging between nodes may be employed other than MPI or MPI-like messaging.

While computing nodes have been described as each having a processor, DRAM cache, flash memory, and a NIC, some nodes could be compute-only nodes without any flash memory. Other nodes may be storage-only and have flash memory but do not execute application programs 122. Nodes may have more than one processor, and may have additional memories, such as a read-only memory for program code, static random-access memory (SRAM), or other DRAM. Several levels of processor cache may be present that may keep even more transient copies of objects in DRAM 22. The processor may include one or more processor chips, which each may have one or more processor cores. For example, in some embodiments the processor includes two, quad-core AMD Opteron™ processor chips.

A computing node may have a processor that executes both a web server and a database server application, or a combined application or applet. The compute node may be able to execute several such applications simultaneously, or several threads that can each handle one or more remote user requests. Software may be partitioned or combined in many different ways. In a first example, some or all of the SDF API's are statically linked into an application program. In a second example, some or all of the SDF API's are in a library that is dynamically linked into an application program. In a third example, some or all of the SDF API's are integrated with an operating system. In a fourth example, a stub library is used to replace at least some operating system calls (such as for file operations) with calls to API's in an SDF library.

The NIC may connect to an Ethernet, an InfiniBand, or some other kind of network, or even multiple network types. While two NIC's 36 are shown per node in FIG. 14, one NIC 36 may be used per node, or more than two. Nodes may be asymmetric and have different hardware rather than all be identical. In FIGS. 16-17, the homed object may be stale, and a more recent modified object from a third-party sharing node may be fetched instead. An acknowledgement to home node 52 then may come from the sharing node rather than from action node 50. Other flow modifications are possible.

In some systems, compute nodes may have multiple processors that have separate DRAM caches but share flash memory. Groups of logical compute nodes may use the same physical hardware. One compute node could act as both action node 50 and home node 52 for one object in some of these variations. SDF could send messages between processors on the same compute node that are acting as action node 50 and home node 52. These intra-node messages may or may not use NIC 36.

Direct-memory access (DMA) may be used to transfer blocks of data, rather than using I/O or other instructions by processor 18 (FIG. 6). The terms permanent and transient are relative to each other rather than absolute. Transient objects in DRAM caches may be flushed or copied back to flash periodically, or after a period of no accesses. DRAM caches may be organized per node, per application, per thread, per container, and various other organizations. A permanent object in flash may still be moved from one node to another, or from one flash block location to another at the same node, such as for wear-leveling, data migration, or de-fragmenting purposes. Permanent is meant to imply durability, or retention of data upon power loss, rather than an unlimited life-time of the object.

A particular object may be replicated, so that several copies of the object are located in flash memory of several different nodes. This replication improves reliability since the home node can fail and one of the back-up replica copies may then be used as the home object. At any given time, only one of the replicas may be designated as the permanent object in flash, while the others are kept as backups. The replica copies may provide additional read-only access to the object.

The node chosen as the home node could change over time to spread the wear of the replicas. Multiple replicas could be used as home objects, but for different groups of nodes, so that each group of nodes has only one of the replicas as its home for the object. In some embodiments, replicas provide read-only access, and write access is performed at the home node.

While the permanent object has been described as residing in flash memory of the home node, and transient copies of the object have been described as residing in DRAM cache on any node, some classes of object may have varying properties. For example, some objects may be stored primarily in DRAM rather than in flash memory, such as DRAM objects 86 of FIG. 15. Some objects may be DRAM-only objects that are never stored in flash memory. Instead, the permanent object is in DRAM at the home node. Alternately, some objects may not be allowed to be present in DRAM caches, but only in flash memory at the home node. These flash-only objects may be copied to DRAM for a specified short period of time only. Some objects may have time limits for residing in DRAM, or may specify how often they must be copied back to flash memory. The maximum number of shared copies allowed may be specified as an attribute.

Objects are a type of element that can be stored in a container. Elements can be fixed-sized or variable-sized. Variable-sized elements may be termed objects. The description above applies similarly to objects that are fixed-size elements, with some differences such as an ability to access fixed-size elements using, for example, a table look-up (based on an address of the element) rather than a hash (based on a key of the object's name).

To aid consistent distribution and location of data through the clustered or distributed flash-memory system, metadata 88 (FIG. 15) may include an indication of a hash function to be performed on the object identifier to generate an identifier of a unit of storage known as a shard, and an indication of a hash function on the container name to generate a node name. A shard-mapping table maps shard identifiers to nodes (for example, via virtual node names), and another table may be used to map virtual node names to physical node addresses to provide a level of indirection in order to enable dynamic configuration of the distributed flash-memory system. Flash object map 82 may be a node map or a local map. Metadata 88 may be stored in flash memory 24 or may be stored in another memory such as a non-volatile write buffer or a battery-backed memory.

In addition to the threading model described where each request is handled by a thread, an event based model could also be used where contexts (with state and progress indicators) are maintained for each request utilizing a handful of threads. Application thread 90 in FIG. 16 uses the address or identifier for home node 52 to send a message to home node 52. Alternatively, at any time during processing of an outgoing request, the application thread may hand off the request to the SDF thread, which performs any of the determining or messaging functions on behalf of the application thread.

The word "may" indicates optionally and/or selectively. An object name may be an object identifier, and an identifier can be a name, key or address. The term thread is sometimes used generically to refer to a locus of execution, and may refer to one or more threads, processes, programs, applications, applets, objects, executing contexts, etc.

In addition to storing all tables in DRAM, tables could also be stored in a DRAM and flash-memory based hierarchy. Tables could be backed up to flash periodically. Backing up tables to flash memory could be specific to a local node or global. In addition to application thread 90 executing SDF protocols on the action node, SDF may process the protocol on a thread that may process more efficiently and act as a proxy for application thread 90. Such a thread may reside in the application process or in an SDF daemon on the same node. Various arrangements, partitionings, and levels of threads, programs, routines, and applications are possible.

The techniques described herein are applicable to various types of databases, such as row-oriented databases, column-oriented databases, relational databases, transactional databases, and databases with and/or without some and/or all of the ACID properties. While specific examples of SDF commands have been given, there are, of course, many possible ways of arranging and/or constructing and/or providing one or more data fabric commands and/or other ways of controlling and/or managing a data fabric to achieve similar effect. Transactions may include lightweight transactions such as for locks, and persistent transactions.

The specific API functions provided by the data fabric vary according to different embodiments. Standard APIs used by applications executing in a single address space are replaced with data fabric APIs that transparently enable the application to execute in a distributed fashion as shown in FIGS. 12A-D.

Flash interface 106 and flash management 108 (FIGS. 7-8) may be software, firmware, hardware, or various combinations. Hardware flash controllers 104 may include firmware. Primitive operation container 240 (FIG. 12D) may also contain log files, database indices, and database tables.

A global ordering of operations on the database may be implemented with a ordering protocol. A protocol for coordinating operations from multiple nodes to the same database in order to provide a global ordering, is two-phase commit. In two-phase commit, there are two communication phases between a particular set of nodes for every database update, the first phase to "prepare" the set of nodes and agree on the update, the second phase to perform the update. A logged 2-phase commit process may be used to facilitate failure recovery. Recoverable decision and update schemes for a clustered or a distributed system such as 3-phase commit, voting or consensus may be used in place of 2-phase commits.

Flash memory based log file containers are enabled to store log records in non-volatile memory, such as battery-backed DRAM, accessible via a flash memory controller, and return the success code with DRAM latency vs. flash memory write latency. For example, the latency to store a 256-byte record to non-volatile DRAM memory is less than 10 microseconds. By comparison, storing 256 bytes to some flash memory takes at least 200 microseconds, and could take longer, if small writes such as 256-byte writes are not directly supported by the flash memory. Other kinds of files, records, or containers could also be stored in a similar manner.

The SDF data fabric further enables efficient checkpoint operations. One or more buffer caches, such as one buffer cache per node, are managed by the data fabric for application programs to use. As data items, such as attributes, database records and rows, are modified, the data items are optionally and/or selectively kept in one of the buffer caches rather than being flushed back to permanent storage. The data fabric may be enabled to provide a copy of a modified data item in the buffer cache of one of the nodes to a program, such as a DBMS storage manager instance executing on another of the nodes and performing a data fabric access operation, such as GET, in lieu of fetching a (stale) copy of the data item from permanent storage.

Periodically, a DBMS program may flush some or all of its modified items back to permanent storage, such as flash memory, to keep the permanent storage contents relatively current. The data fabric may be enabled to accelerate the flushing by automatically copying all of the modified data items back to permanent storage. For example, the DBMS software may use a data fabric GLOBAL FLUSH command to initiate this operation.

DBMS program 200, 200' are scalable, since additional compute nodes may be added, each with a DBMS program 200, to improve the number of user queries that can be processed simultaneously. All compute nodes are able to access the same partitioned database that is stored persistently in flash memory on the storage nodes. The SDF allows all compute nodes to access the same database on the storage nodes in a scalable fashion, since SDF caches portions of the database being accessed in each compute node's local buffer cache. The performance and query throughput is a linear (or nearly linear) function of system cost and/or size (number of nodes). The system can be more cost effective and/or scale to larger sizes than symmetric multiprocessor (SMP) systems. A DBMS which has been written to execute in a single address space can execute as DBMS program 200 on the scalable hardware and software platform shown in FIGS. 5-8 with minimal or no modifications of software of the DBMS. Certain centralized functions of a DBMS, such as the logging and the checkpointing, are efficiently scalable (and thus efficient for larger systems) without extensive modifications to the DBMS software.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result. Processes and programs may be tangibly embodied on computer-readable storage such as computer disks, flash memory, main memory, optical disks, magnetic disks, etc.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A distributed multi-node database comprising:
   a plurality of compute nodes, each compute node comprising:
   a compute processor for executing threads and programs;
   a database management system (DBMS) program executing on the compute processor, the DBMS program receiving a database query from a user, the database query specifying a target database record;
   a Sharing Data Fabric (SDF) thread executing on the compute processor;
   a local buffer cache accessed by the DBMS program, the local buffer cache storing a cached database record of the target database record that is accessed by the DBMS program, wherein the local buffer cache continually stores, without ejecting, one or more database indexes for the multi-node database;

a plurality of storage nodes, each storage node comprising:
  a non-volatile memory for storing a portion of a database comprising persistent database records;
  a storage processor executing a storage thread;
  wherein the non-volatile memory is a solid-state memory that retains data when power is disconnected; and a physical interconnect that connects the plurality of compute nodes to the plurality of storage nodes;

wherein the SDF thread is activated by the DBMS program when the target database record is not present in the local buffer cache;

wherein the SDF thread identifies a target storage node in the plurality of storage nodes, the target storage node storing the target database record in the portion of the database stored on the target storage node;

wherein the storage thread reads the target database record from the non-volatile memory of the target storage node and sends the target database record over the physical interconnect to the SDF thread on the compute node for storage in the local buffer cache as the cached database record, whereby the DBMS program on the compute node processes the database query using the SDF thread to fetch the target database record from the target storage node using the storage thread.

2. The distributed multi-node database of claim 1 wherein the DBMS program executing on the compute processor accesses the database stored on the plurality of storage nodes using the SDF thread executing on the compute processor, the SDF thread communicating with the storage thread executing on the storage processor to load the cached database record into the local buffer cache;
  wherein the DBMS program executes in an address space on a single node;
  wherein the SDF thread makes the database visible within the address space to the DBMS program;
  wherein the database appears to the DBMS program to be stored on the compute node of the DBMS program, wherein the SDF thread communicating with the storage thread transparently access the database stored on the plurality of storage nodes,
  whereby the DBMS program transparently accesses the database stored on the plurality of storage nodes using the SDF thread.

3. The distributed multi-node database of claim 2 wherein a plurality of the DBMS program executing on the compute processor on the plurality of compute nodes simultaneously access the database stored on the plurality of storage nodes in the address space,
  whereby multiple DBMS programs access the database in the address space.

4. The distributed multi-node database of claim 1 wherein each compute node is also a storage node, wherein the compute processor and the storage processor are a shared processor that executes the DBMS program and the SDF thread;
  wherein the target database record is read for the SDF thread from the non-volatile memory when the target storage node is the compute node of the DBMS program processing the database query,
  whereby the SDF thread directly reads the non-volatile memory when the target storage node is a local node of the DBMS program.

5. The distributed multi-node database of claim 1 wherein the DBMS program further comprises:

a query process, executing on the compute processor, for processing the database query to identify the target database record; and a storage manager, executing on the compute processor, for identifying the cached database record from the local buffer cache when the cached database record is a copy of the target database record;

wherein the storage manager activates the SDF thread to retrieve the target database record and load a copy of the target database record into the local buffer cache when the target database record misses in the local buffer cache.

6. The distributed multi-node database of claim 5 wherein the DBMS program further comprises:
  a log writer that sends a log message to a log storage node in the plurality of storage nodes;
  wherein a logical sequence number is associated with the log message stored in the log file,
  whereby operations performed by the DBMS program are logged at the log storage node.

7. The distributed multi-node database of claim 5 wherein the database stored on the plurality of storage nodes comprises:
  database tables that comprise a plurality of database records including the target database record;
  database indices that index the database tables; and
  log files that log operations performed on the database.

8. The distributed multi-node database of claim 1 wherein the compute node further comprises:
  a transaction table that stores a list of database records modified by a transaction and an initial state for database records touched by the transaction;
  transaction recovery means for aborting the transaction by restoring the database records modified by the transaction to their initial state stored in the transaction table;
  wherein the transaction is a series of operations performed by the DBMS program that are all committed together or all aborted together,
  whereby transactions are aborted using the transaction table.

9. The distributed multi-node database of claim 8 wherein the compute node further comprises:
  transaction-commit means for updating a database record, activated when all operations in the transaction are successfully completed and all outstanding requests for database records modified by the transaction are completed;
  persistent-update means, activated by the transaction-commit means, for sending the database records modified by the transaction to home nodes in the plurality of storage nodes, the home nodes updating persistent database records in the non-volatile memory using the modified database records with changes from the transaction,
  whereby transactions are committed by updating persistent database records at home nodes once all outstanding requests have successfully completed for all database records modified by the transaction.

10. The distributed multi-node database of claim 1 further comprising:
  an applications-programming interface (API) to the SDF thread, the API being called by the DBMS program to get the target database record that is not present in the local buffer cache, the SDF thread communicating with the storage thread on the target storage node to copy the target database record into the local buffer cache as the cached database record read by the DBMS program, wherein the DBMS program is not aware that the target database record is located at the target storage node;

whereby the DBMS program uses the API to activate the SDF thread to transparently copy the target database record from the target storage node.

11. The distributed multi-node database of claim 10 wherein the API to the SDF thread comprises a multiprocessing interface, a mutual-exclusion MUTEX library routine, or a shared container of synchronization primitives including test-and-set or compare-and-swap.

12. The distributed multi-node database of claim 1 wherein the storage node further comprises:

a global cache directory having a sharing list, the sharing list being a list of sharing nodes in the plurality of compute nodes that store the cached database record that is a copy of the target database record stored in the non-volatile memory of the storage node;

a database record map that is used by the storage thread to locate the target database record within the non-volatile memory in response to a request for the target database record from the compute node, whereby the target database record is located with the database record map and compute nodes storing copies of the target database record are located using the global cache directory.

13. The distributed multi-node database of claim 1 wherein the non-volatile memory stores database records in electrically-erasable programmable read-only memory (EEPROM) memory cells or in phase-change memory (PCM) cells.

14. The distributed multi-node database of claim 1 wherein the non-volatile memory consumes less power than a rotating disk when accessing the database, whereby power consumption is reduced.

* * * * *